(12) United States Patent
Sun et al.

(10) Patent No.: US 11,792,676 B2
(45) Date of Patent: Oct. 17, 2023

(54) CHARGING RULE BINDING METHOD, DEVICE, AND SYSTEM

(71) Applicant: HUAWEI TECHNOLOGIES CO., LTD., Guangdong (CN)

(72) Inventors: Haiyang Sun, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 17/331,004

(22) Filed: May 26, 2021

(65) Prior Publication Data
US 2021/0282049 A1   Sep. 9, 2021

Related U.S. Application Data

(63) Continuation of application No. PCT/CN2020/073058, filed on Jan. 19, 2020.

(30) Foreign Application Priority Data

| Mar. 28, 2019 | (CN) | .......................... 201910242394.4 |
| Jun. 14, 2019 | (CN) | .......................... 201910517306.7 |
| Nov. 8, 2019  | (CN) | .......................... 201911086724.1 |

(51) Int. Cl.
*H04W 28/02*   (2009.01)
*H04M 15/00*   (2006.01)
*H04W 28/24*   (2009.01)

(52) U.S. Cl.
CPC ....... *H04W 28/0268* (2013.01); *H04M 15/66* (2013.01); *H04W 28/24* (2013.01)

(58) Field of Classification Search
CPC ... H04W 28/0268; H04W 28/24; H04W 4/24; H04M 15/66; H04M 15/8016;
(Continued)

(56) References Cited

U.S. PATENT DOCUMENTS

| 2008/0132269 A1 | 6/2008 | Shen et al. |
| 2011/0202485 A1 | 8/2011 | Cutler et al. |

(Continued)

FOREIGN PATENT DOCUMENTS

| CN | 101350728 A | 1/2009 |
| CN | 103636279 A | 3/2014 |

(Continued)

OTHER PUBLICATIONS

3GPP TS 23.503 V15.5.0 (Dec. 2018), "3rd Generation Partnership Project; Technical Specification Group Services and System Aspects; Policy and Charging Control Framework for the 5G System; Stage 2 (Release 15)," Dec. 2018, 78 pages.

(Continued)

*Primary Examiner* — Abdullahi Ahmed
(74) *Attorney, Agent, or Firm* — Fish & Richardson P.C.

(57) ABSTRACT

This application provide a method, a device, and a system. The method performed by a session management network element includes: receiving, by the session management network element, a first policy and charging control (PCC) rule from a policy control network element, wherein the first PCC rule comprises indication information, and the indication information indicates that a service corresponding to the first PCC rule is a time sensitive service; and binding, by the session management network element, the first PCC rule to a quality of service (QoS) flow, wherein no other PCC rule is bound to the QoS flow.

18 Claims, 12 Drawing Sheets

(58) Field of Classification Search
CPC ......... H04M 15/8038; H04M 15/8044; H04M 15/8228; H04L 47/2441; H04L 12/14; H04L 12/1407
See application file for complete search history.

(56) References Cited

U.S. PATENT DOCUMENTS

| | | | |
|---|---|---|---|
| 2011/0289196 A1 | 11/2011 | Siddam | |
| 2020/0137615 A1* | 4/2020 | Joseph | H04W 24/02 |
| 2020/0267084 A1* | 8/2020 | Hande | H04L 47/28 |
| 2020/0351804 A1* | 11/2020 | Moon | H04W 76/25 |
| 2021/0076407 A1* | 3/2021 | Joseph | H04W 56/004 |
| 2021/0099341 A1* | 4/2021 | Moon | H04W 56/001 |
| 2021/0144733 A1* | 5/2021 | Rost | H04L 47/24 |
| 2021/0168658 A1* | 6/2021 | Yu | H04M 15/66 |

FOREIGN PATENT DOCUMENTS

| | | |
|---|---|---|
| CN | 106937351 A | 7/2017 |
| CN | 108353310 A | 7/2018 |
| CN | 108810884 A | 11/2018 |
| CN | 111491313 A | 8/2020 |
| CN | 111756555 A | 10/2020 |
| CN | 111865623 A | 10/2020 |
| WO | 2011147465 A1 | 12/2011 |
| WO | 2018232605 A1 | 12/2018 |

OTHER PUBLICATIONS

3GPP TS 29.500 V15.3.0 (Mar. 2019), "3rd Generation Partnership Project; Technical Specification Group Core Network and Terminals; 5G System; Technical Realization of Service Based Architecture; Stage 3 (Release 15)" Mar. 2019, 33 pages.

3GPP TS 33.501 V15.3 1 (Dec. 2018), "3rd Generation Partnership Project;Technical Specification Group Services and System Aspects;Security architecture and procedures for 5G system(Release 15)," Dec. 2018, 182 pages.

Office Action issued in Chinese Application No. 202010726143.6 dated Mar. 30, 2021, 15 pages (with English translation).

PCT International Search Report and Written Opinion issued in International Application No. PCT/CN2020/073058 dated Mar. 30, 2020, 11 pages (partial English translation).

Huawei, Hisillicon, "Prioritized Service be aware by AMF," 3GPP TSG-SA WG2 Meeting #127bis, S2-185107, Newport Beach, USA, May 28-Jun. 1, 2018, 20 pages.

Office Action issued in Chinese Application No. 201911086724.1 dated Oct. 25, 2021, 12 pages.

3GPP TS 23.503 V16.0.0 (Mar. 2019), "3rd Generation Partnership Project; Technical Specification Group Services and System Aspects; Policy and Charging Control Framework for the 5G System; Stage 2(Release 16)," Mar. 2019, 84 pages.

3GPP TS 23.502 V16.0.0 (Mar. 2019), "3rd Generation Partnership Project; Technical Specification Group Services and System Aspects; Procedures for the 5G System; Stage 2(Release 16)," Mar. 2019, 420 pages.

Office Action issued in Chinese Application No. 202010726143.6 dated Sep. 14, 2021, 4 pages.

Ericsson, "Updating 'QoS Flow of default QoS rule' and clean up," 3GPP SA WG2 Meeting #124, S2-178576, Reno Nevada, USA, Nov. 27-Dec. 1, 2017, 12 pages.

Extended European Search Report issued in European Application No. 20776377.2 dated Dec. 14, 2021, 7 pages.

* cited by examiner

CHARGING RULE BINDING METHOD, DEVICE, AND SYSTEM

CROSS-REFERENCE TO RELATED APPLICATIONS

This application is a continuation of International Application No. PCT/CN2020/073058, filed on Jan. 19, 2020, which claims priority to Chinese Patent Application No. 201910242394.4, filed on Mar. 28, 2019 and Chinese Patent Application No. 201910517306.7, filed on Jun. 14, 2019 and Chinese Patent Application No. 201911086724.1, filed on Nov. 8, 2019. All of the aforementioned patent applications are hereby incorporated by reference in their entireties.

TECHNICAL FIELD

This application relates to the field of communications technologies and, in particular, to a charging rule binding method, a device, and a system.

BACKGROUND

The binding mechanism is the procedure that associates a service data flow (defined in a policy and charging control (PCC) rule by means of the service data flow (SDF) template), to the quality of service (QoS) flow deemed to transport the service data flow. An existing binding mechanism includes the following three steps:

Step 1: Session binding: Application function (AF) sessions one-to-one correspond to protocol data unit (PDU) sessions. For details, refer to an existing implementation. Details are not described herein.

Step 2: PCC rule authorization: A policy control function (PCF) network element performs PCC rule authorization to authorize a PCC rule and allocate a QoS parameter to the PCC rule. For details, refer to an existing implementation. Details are not described herein.

Step 3: QoS flow binding: QoS flow binding is the association of a PCC rule to a QoS flow within a PDU session. The binding is performed using the following binding parameters (English: QoS flow binding is the association of a PCC rule to a QoS Flow within a PDU Session. The binding is performed using the following binding parameters): a 5th generation (5G) QoS identifier (5QI) and an allocation and retention priority (ARP). Optionally, if the PCC rule includes one or more of the following parameters, the one or more of the following parameters may be used as the binding parameters: QoS notification control (QNC), a priority level, an averaging window, or a maximum data burst volume (MDBV). Certainly, the priority level, the averaging window, or the maximum data burst volume may alternatively be a parameter of a QoS attribute corresponding to the 5QI. This is not specifically limited herein.

According to the prior art, PCC rules with the same binding parameter are bound to a same QoS flow. Consequently, a multi-level PCC rule and a single-level PCC rule that have the same binding parameter are bound to a same QoS flow, causing incorrect scheduling by a radio access network (RAN) device.

SUMMARY

Embodiments of this application provide a charging rule binding method, a device, and a system, to resolve a prior-art problem that a RAN device performs incorrect scheduling because PCC rules with a same binding parameter are bound to a same QoS flow.

To achieve the foregoing objective, the following technical solutions are used in the embodiments of this application.

According to a first aspect, a charging rule binding method is provided. The method includes: A session management network element receives a first policy and charging control PCC rule from a policy control network element. The session management network element determines that the first PCC rule is a multi-level PCC rule. The session management network element creates a quality of service flow QoS flow according to the first PCC rule and binds the first PCC rule to the created QoS flow, where the QoS flow is bound to only the first PCC rule. Based on this solution, in this embodiment of this application, each multi-level PCC rule is bound to a different QoS flow. This avoids a problem that a multi-level PCC rule and a single-level PCC rule that have a same binding parameter are bound to a same QoS flow, or that multi-level PCC rules having a same binding parameter but different ranking levels are bound to a same QoS flow, thereby further avoiding incorrect scheduling by a RAN device.

In a possible design, the first PCC rule includes indication information, and the indication information is used to indicate that the first PCC rule is the multi-level PCC rule. That the session management network element determines that the first PCC rule is a multi-level PCC rule includes: The session management network element determines, based on the indication information, that the first PCC rule is the multi-level PCC rule. Based on this solution, the session management network element can determine that the first PCC rule is the multi-level PCC rule.

In a possible design, the first PCC rule includes N alternative QoS parameter sets, and N is a positive integer greater than 1. That the session management network element determines that the first PCC rule is a multi-level PCC rule includes: The session management network element determines, based on the N alternative QoS parameter sets, that the first PCC rule is the multi-level PCC rule. Based on this solution, the session management network element can determine that the first PCC rule is the multi-level PCC rule.

According to a second aspect, a charging rule binding method is provided. The method includes: A session management network element receives a first policy and charging control PCC rule from a policy control network element, where the first PCC rule includes a binding parameter, and a binding parameter at leach level in the binding parameter corresponds to one rank value. The session management network element determines, from a PCC rule bound to an existing quality of service flow QoS flow, whether there is a PCC rule in which a binding parameter corresponding to each of all rank values is the same as a binding parameter that is in the first PCC rule and that corresponds to a same rank value in all rank values. If there is the PCC rule, the session management network element binds the first PCC rule to the existing QoS flow; or if there is no such PCC rule, the session management network element creates a QoS flow according to the first PCC rule and binds the first PCC rule to the created QoS flow. Based on this solution, in this embodiment of this application, only the PCC rule in which the binding parameter corresponding to each of all the rank values is the same as the binding parameter corresponding to the same rank value in all the rank values in the first PCC rule can be bound to a same QoS flow. Therefore, a problem that a multi-level PCC rule and a single-level PCC rule that have a same binding parameter are bound to a same QoS flow, or multi-level PCC rules having a same binding parameter but different ranking levels are bound to a same QoS flow is avoided, thereby further avoiding incorrect scheduling by a RAN device.

In a possible design, that a binding parameter at leach level in the binding parameter corresponds to one rank value includes: a binding parameter at leach level in the binding parameter includes one rank value.

In a possible design, that a binding parameter at leach level in the binding parameter corresponds to one rank value includes: the first PCC rule further includes the rank value corresponding to a binding parameter at leach level in the binding parameter.

According to a third aspect, a charging rule binding method is provided. The method includes: A session management network element receives a first policy and charging control PCC rule from a policy control network element. The session management network element determines, from a PCC rule bound to an existing quality of service flow QoS flow, whether there is a PCC rule in which binding parameters at each level are the same as binding parameters at each level in the first PCC rule respectively. If there is the PCC rule, the session management network element binds the first PCC rule to the existing QoS flow; or if there is no such PCC rule, the session management network element creates a QoS flow according to the first PCC rule and binds the first PCC rule to the created QoS flow. Based on this solution, in this embodiment of this application, only the PCC rule in which the binding parameters at each level are the same as the binding parameters at each level in the first PCC rule respectively can be bound to a same QoS flow. Therefore, a problem that a multi-level PCC rule and a single-level PCC rule that have a same binding parameter are bound to a same QoS flow, or multi-level PCC rules having a same binding parameter but different ranking levels are bound to a same QoS flow is avoided, thereby further avoiding incorrect scheduling by a RAN device.

In a possible design, that the session management network element determines, from a PCC rule bound to an existing QoS flow, whether there is a PCC rule in which binding parameters at each level are the same as binding parameters at each level in the first PCC rule respectively includes: The session management network element determines, from the PCC rule bound to the existing QoS flow, whether there is a PCC rule for which a corresponding maximum rank value is the same as a maximum rank value corresponding to the first PCC rule. If there is a second PCC rule for which a corresponding maximum rank value is the same as the maximum rank value corresponding to the first PCC rule, and binding parameters at each level in the second PCC rule are the same as the binding parameters at each level in the first PCC rule respectively, the session management network element determines, from the PCC rule bound to the existing QoS flow, that there is the PCC rule in which the binding parameters are the same as the binding parameters at each level in the first PCC rule respectively; or if there is no such PCC rule for which a corresponding maximum rank value is the same as the maximum rank value corresponding to the first PCC rule, the session management network element determines, from the PCC rule bound to the existing QoS flow, that there is no such PCC rule in which the binding parameters at each level are the same as the binding parameters at each level in the first PCC rule respectively. Based on this solution, the session management network element may determine, from the PCC rule bound to the existing QoS flow, whether there is the PCC rule in which the binding parameters at each level are the same as the binding parameters at each level in the first PCC rule respectively.

According to a fourth aspect, a communications apparatus is provided to implement the foregoing methods. The communications apparatus may be a session management network element according to the first aspect, the second aspect, the third aspect, a thirteenth aspect, a seventeenth aspect, or a twentieth aspect, or an apparatus including the session management network element. Alternatively, the communications apparatus may be a policy control network element according to a fourteenth aspect, or an apparatus including the policy control network element. The communications apparatus includes a corresponding module, unit, or means for implementing the foregoing method. The module, unit, or means may be implemented by hardware or software, or implemented by hardware executing corresponding software. The hardware or the software includes one or more modules or units corresponding to the foregoing functions.

According to a fifth aspect, a communications apparatus is provided. The communications apparatus includes a processor and a memory. The memory is configured to store a computer instruction, and when the processor executes the instruction, the communications apparatus is enabled to perform the method according to the first aspect. The communications apparatus may be a session management network element according to the first aspect, the second aspect, the third aspect, a thirteenth aspect, a seventeenth aspect, or a twentieth aspect, or an apparatus including the session management network element. Alternatively, the communications apparatus may be a policy control network element according to a fourteenth aspect, or an apparatus including the policy control network element.

According to a sixth aspect, a communications apparatus is provided. The communications apparatus includes a processor. The processor is configured to: be coupled to a memory, and after reading an instruction from the memory, perform the method according to the first aspect, the second aspect, or the third aspect based on the instruction. The communications apparatus may be a session management network element according to the first aspect, the second aspect, the third aspect, a thirteenth aspect, a seventeenth aspect, or a twentieth aspect, or an apparatus including the session management network element. Alternatively, the communications apparatus may be a policy control network element according to a fourteenth aspect, or an apparatus including the policy control network element.

According to a seventh aspect, a computer readable storage medium is provided. The computer readable storage medium stores an instruction, and when the instruction is run on a computer, the computer may be enabled to perform the method according to the first aspect, the second aspect, the third aspect, a thirteenth aspect, a fourteenth aspect, a seventeenth aspect, or a twentieth aspect.

According to an eighth aspect, a computer program product including an instruction is provided. When the computer program product is run on a computer, the computer may be enabled to perform the method according to the first aspect, the second aspect, the third aspect, a thirteenth aspect, a fourteenth aspect, a seventeenth aspect, or a twentieth aspect.

According to a ninth aspect, a communications apparatus (for example, the communications apparatus may be a chip or a chip system) is provided. The communications apparatus includes a processor, configured to implement the functions according to the first aspect, the second aspect, the third aspect, a thirteenth aspect, a fourteenth aspect, a seventeenth aspect, or a twentieth aspect. In a possible design, the communications apparatus further includes a memory. The memory is configured to store a program instruction and data that are necessary. When the communications apparatus is the chip system, the communications apparatus may include a chip, or may include a chip and another discrete component.

For technical effects brought by any design manner in the fourth aspect to the ninth aspect, refer to technical effects brought by different design manners in the first aspect, the second aspect, the third aspect, a thirteenth aspect, a fourteenth aspect, a seventeenth aspect, or a twentieth aspect. Details are not described herein again.

According to a tenth aspect, a communications system is provided. The communications system includes a policy control network element and a session management network element. The policy control network element is configured to send a first PCC rule to the session management network element. The session management network element is configured to receive the first PCC rule from the policy control network element. The session management network element is further configured to: after determining that the first PCC rule is a multi-level PCC rule, create a QoS flow according to the first PCC rule and bind the first PCC rule to the created QoS flow, where the QoS flow is bound to only the first PCC rule. For a technical effect of the tenth aspect, refer to the technical effect of the first aspect. Details are not described herein again.

According to an eleventh aspect, a communications system is provided. The communications system includes a policy control network element and a session management network element. The policy control network element is configured to send a first PCC rule to the session management network element. The session management network element is configured to receive the first PCC rule from the policy control network element. The first PCC rule includes a binding parameter, and a binding parameter at leach level in the binding parameter corresponds to one rank value. The session management network element is further configured to determine, from a PCC rule bound to an existing QoS flow, whether there is a PCC rule in which a binding parameter corresponding to each of all rank values is the same as a binding parameter that is in the first PCC rule and that corresponds to a same rank value in all rank values. If there is the PCC rule, the session management network element is further configured to bind the first PCC rule to the existing QoS flow; or if there is no such PCC rule, the session management network element is further configured to: create a QoS flow according to the first PCC rule, and bind the first PCC rule to the created QoS flow. For a technical effect of the eleventh aspect, refer to the technical effect of the second aspect. Details are not described herein again.

According to a twelfth aspect, a communications system is provided. The communications system includes a policy control network element and a session management network element. The policy control network element is configured to send a first PCC rule to the session management network element. The session management network element is configured to receive the first PCC rule from the policy control network element. The session management network element is further configured to determine, from a PCC rule bound to an existing QoS flow, whether there is a PCC rule in which binding parameters at each level are the same as binding parameters at each level in the first PCC rule respectively. If there is the PCC rule, the session management network element is further configured to bind the first PCC rule to the existing QoS flow; or if there is no such PCC rule, the session management network element is further configured to: create a QoS flow according to the first PCC rule, and bind the first PCC rule to the created QoS flow. For a technical effect of the twelfth aspect, refer to the technical effect of the third aspect. Details are not described herein again.

According to a thirteenth aspect, a charging rule binding method is provided. The method includes: A session management network element receives a first policy and charging control PCC rule from a policy control network element. The session management network element determines that the first PCC rule needs to be bound to a separate quality of service flow QoS flow. The session management network element creates a QoS flow according to the first PCC rule, and binds the first PCC rule to the created QoS flow. Based on this solution, in this embodiment of this application, each multi-level PCC rule is bound to a different QoS flow. Therefore, a problem that a multi-level PCC rule and a single-level PCC rule that have a same binding parameter are bound to a same QoS flow, or multi-level PCC rules having a same binding parameter but different ranking levels are bound to a same QoS flow is avoided, thereby further avoiding incorrect scheduling by a RAN device.

In a possible design, the first PCC rule includes indication information. That the session management network element determines that the first PCC rule needs to be bound to a separate QoS flow includes: The session management network element determines, based on the indication information, that the first PCC rule needs to be bound to the separate QoS flow. Based on this solution, the session management network element may determine that the first PCC rule needs to be bound to the separate QoS flow.

In a possible design, the indication information is any one of the following: the indication information is information indicating that the first PCC rule needs to be bound to the separate QoS flow; the indication information is information indicating that the first PCC rule is a multi-level PCC rule; the indication information is information indicating that a service corresponding to the first PCC rule supports multi-access; the indication information is information indicating that a service corresponding to the first PCC rule is an ultra-reliable low-latency communication URLLC service; the indication information is information indicating that a service corresponding to the first PCC rule requires redundant transmission; the indication information is information indicating that a data network access identifier DNAI in the first PCC rule is different from another DNAI in a current session; the indication information is information indicating that a packet error rate PER in the first PCC rule is different from another PER in a current session; the indication information is information indicating that a service corresponding to the first PCC rule requires a first radio access technology RAT; the indication information is information indicating that a service corresponding to the first PCC rule requires QoS monitoring; the indication information is information indicating that a maximum bit rate in the first PCC rule is greater than a guaranteed bit rate; the indication information is information indicating that a transmission delay of a data packet of a service corresponding to the first PCC rule exceeds a packet delay budget PDB and therefore the data packet needs to be discarded; the indication information is information indicating that a 5th generation quality of service identifier 5QI resource type in the first PCC rule is a delay critical guaranteed bit rate GBR; or the indication information is information indicating that a service corresponding to the first PCC rule is a time sensitive service.

In a possible design, the QoS flow is bound to only the first PCC rule.

In a possible design, that the QoS flow is bound to only the first PCC rule includes: The session management network element determines, based on a flag bit in the session management network element, that a second PCC rule cannot be bound to the QoS flow.

According to a fourteenth aspect, a charging rule binding method is provided. The method includes: A policy control network element determines that a first PCC rule needs to be bound to a separate quality of service flow QoS flow. The policy control network element sends the first PCC rule to a session management network element, where the first PCC rule includes indication information, and the indication information is used to indicate that the first PCC rule needs to be bound to the separate QoS flow. Based on this solution, in this embodiment of this application, each multi-level PCC rule is bound to a different QoS flow. Therefore, a problem that a multi-level PCC rule and a single-level PCC rule that have a same binding parameter are bound to a same QoS flow, or multi-level PCC rules having a same binding parameter but different ranking levels are bound to a same QoS flow is avoided, thereby further avoiding incorrect scheduling by a RAN device.

In a possible design, that a policy control network element determines that a first PCC rule needs to be bound to a separate QoS flow includes: When one or more of the following conditions are met, the policy control network element determines that the first PCC rule needs to be bound to the separate QoS flow: To ensure that a QoS flow of the first PCC rule is not bound to another PCC rule, the first PCC rule is a multi-level PCC rule; a service corresponding to the first PCC rule supports multi-access; a service corresponding to the first PCC rule is an ultra-reliable low-latency communication URLLC service; a service corresponding to the first PCC rule requires redundant transmission; a data network access identifier DNAI in the first PCC rule is different from another DNAI in a current session; a packet error rate PER in the first PCC rule is different from another PER in a current session; a service corresponding to the first PCC rule requires a first radio access technology RAT; a maximum bit rate in the first PCC rule is greater than a guaranteed bit rate; a 5QI resource type in the first PCC rule is a delay critical guaranteed bit rate GBR; a service corresponding to the first PCC rule requires QoS detection; a transmission delay of a data packet of a service corresponding to the first PCC rule exceeds a packet delay budget PDB and therefore the data packet needs to be discarded; and a service corresponding to the first PCC rule is a time sensitive service.

According to a fifteenth aspect, a communication method is provided, and includes: A policy control network element sends a first policy and charging control PCC rule to a session management network element. The session management network element receives the first PCC rule from the policy control network element. The session management network element determines that the first PCC rule needs to be bound to a separate quality of service flow QoS flow. The session management network element creates a QoS flow according to the first PCC rule and binds the first PCC rule to the created QoS flow. For a technical effect of the fifteenth aspect, refer to the technical effect of the thirteenth aspect. Details are not described herein again.

According to a sixteenth aspect, a communications system is provided. The communications system includes a session management network element and a policy control network element. The policy control network element is configured to send a first policy and charging control PCC rule to the session management network element. The session management network element is configured to receive the first PCC rule from the policy control network element. The session management network element is further configured to determine that the first PCC rule needs to be bound to a separate quality of service flow QoS flow. The session management network element is further configured to: create a QoS flow according to the first PCC rule and bind the first PCC rule to the created QoS flow. For a technical effect of the sixteenth aspect, refer to the technical effect of the thirteenth aspect. Details are not described herein again.

According to a seventeenth aspect, a charging rule binding method is provided. The method includes: A session management network element receives a first policy and charging control PCC rule from a policy control network element, where the first PCC rule includes a binding parameter. The session management network element determines, from an existing quality of service flow QoS flow, whether there is a QoS flow for which a binding parameter is the same as the binding parameter in the first PCC rule. If there is the QoS flow, the session management network element binds the first PCC rule to the existing QoS flow; or if there is no such QoS flow, the session management network element creates a QoS flow according to the first PCC rule and binds the first PCC rule to the created QoS flow. According to the charging rule binding method provided in this embodiment of this application, in this embodiment of this application, only a PCC rule in which a binding parameter is the same as the binding parameter in the first PCC rule can be bound to a same QoS flow. Therefore, a problem that a multi-level PCC rule and a single-level PCC rule that have a same binding parameter are bound to a same QoS flow is avoided, thereby further avoiding incorrect scheduling by a RAN device.

In a possible design, that the session management network element determines, from an existing QoS flow, whether there is a QoS flow for which a binding parameter is the same as the binding parameter in the first PCC rule includes: When the session management network element determines, from a PCC rule bound to the existing QoS flow, that there is a second PCC rule in which a value of a binding parameter of a policy control part is the same as a value of a binding parameter of a policy control part in the first PCC rule, and a value of a binding parameter of an alternative QoS parameter set part in the second PCC rule is the same as a value of a binding parameter of an alternative QoS parameter set part in the first PCC rule, the session management network element determines, from the existing quality of service flow QoS flow, that there is the QoS flow for which the binding parameter is the same as the binding parameter in the first PCC rule.

In a possible design, the binding parameter in this embodiment of this application includes an alternative QoS parameter set.

According to an eighteenth aspect, a communication method is provided. The communication method includes: A policy control network element sends a first policy and charging control PCC rule to a session management network element, where the first PCC rule includes a binding parameter. The session management network element receives the first PCC rule from the policy control network element and determines, from an existing quality of service flow QoS flow, whether there is a QoS flow for which a binding parameter is the same as the binding parameter in the first PCC rule. If there is the QoS flow, the session management network element binds the first PCC rule to the existing QoS flow; or if there is no such QoS flow, the session management network element creates a QoS flow according to the first PCC rule and binds the first PCC rule to the created QoS flow. For a technical effect of the eighteenth aspect, refer to the technical effect of the seventeenth aspect. Details are not described herein again.

According to a nineteenth aspect, a communications system is provided. The communications system includes a policy control network element and a session management network element. The policy control network element is configured to send a first policy and charging control PCC rule to the session management network element, where the first PCC rule includes a binding parameter. The session management network element is configured to: receive the first PCC rule from the policy control network element and determine, from an existing quality of service flow QoS flow, whether there is a QoS flow for which a binding parameter is the same as the binding parameter in the first PCC rule. The session management network element is further configured to: if there is the QoS flow, bind the first PCC rule to the existing QoS flow; or if there is no such QoS flow, create a QoS flow according to the first PCC rule and bind the first PCC rule to the created QoS flow. For a technical effect of the nineteenth aspect, refer to the technical effect of the seventeenth aspect. Details are not described herein again.

According to a twentieth aspect, a charging rule binding method is provided. The method includes: A session management network element receives a first policy and charging control PCC rule from a policy control network element, where the first PCC rule includes a first binding parameter. When the session management network element determines that the first PCC rule includes an alternative quality of service QoS parameter set; and in a PCC rule bound to an existing first QoS flow, there is a second PCC rule in which a value of the first binding parameter is the same as a value of the first binding parameter included in the first PCC rule, and the second PCC rule includes an alternative QoS parameter set, the session management network element binds the first PCC rule to the existing first QoS flow. Alternatively, when the session management network element determines that the first PCC rule does not include an alternative QoS parameter set; and in a PCC rule bound to an existing second QoS flow, there is a third PCC rule in which a value of the first binding parameter is the same as a value of the first binding parameter included in the first PCC rule, and the third PCC rule does not include an alternative QoS parameter set, the session management network element binds the first PCC rule to the existing second QoS flow. In other words, in this embodiment of this application, when other binding parameters in PCC rules are the same, one or more PCC rules that include alternative QoS parameter sets may be considered as PCC rules having a same binding parameter, and one or more PCC rules that do not include alternative QoS parameter sets may be considered as PCC rules having a different binding parameter. Further, the one or more PCC rules having the same binding parameter can be bound to a same QoS flow, and the one or more PCC rules having the different binding parameters cannot be bound to a same QoS flow. In this way, a problem that a multi-level PCC rule and a single-level PCC rule that have a same binding parameter are bound to a same QoS flow is avoided, thereby further avoiding incorrect scheduling by a RAN device.

According to a twenty-first aspect, a communication method is provided. The method includes: A policy control network element sends a first policy and charging control PCC rule to a session management network element, where the first PCC rule includes a first binding parameter. The session management network element receives the first PCC rule from the policy control network element. When the session management network element determines that the first PCC rule includes an alternative quality of service QoS parameter set; and in a PCC rule bound to an existing first QoS flow, there is a second PCC rule in which a value of the first binding parameter is the same as a value of the first binding parameter included in the first PCC rule, and the second PCC rule includes an alternative QoS parameter set, the session management network element binds the first PCC rule to the existing first QoS flow. Alternatively, when the session management network element determines that the first PCC rule does not include an alternative QoS parameter set; and in a PCC rule bound to an existing second QoS flow, there is a third PCC rule in which a value of the first binding parameter is the same as a value of the first binding parameter included in the first PCC rule, and the third PCC rule does not include an alternative QoS parameter set, the session management network element binds the first PCC rule to the existing second QoS flow. For a technical effect of the twenty-first aspect, refer to the technical effect of the twentieth aspect. Details are not described herein again.

According to a twenty-second aspect, a communications system is provided. The communications system includes a policy control network element and a session management network element. The policy control network element is configured to send a first policy and charging control PCC rule to the session management network element, where the first PCC rule includes a first binding parameter. The session management network element is configured to receive the first PCC rule from the policy control network element. The session management network element is further configured to: when determining that the first PCC rule includes an alternative quality of service QoS parameter set; and in a PCC rule bound to an existing first QoS flow, there is a second PCC rule in which a value of the first binding parameter is the same as a value of the first binding parameter included in the first PCC rule and the second PCC rule includes an alternative QoS parameter set, bind the first PCC rule to the existing first QoS flow. Alternatively, the session management network element is further configured to: when determining that the first PCC rule does not include an alternative QoS parameter set; and in a PCC rule bound to an existing second QoS flow, there is a third PCC rule in which a value of the first binding parameter is the same as a value of the first binding parameter included in the first PCC rule, and the third PCC rule does not include an alternative QoS parameter set, bind the first PCC rule to the existing second QoS flow. For a technical effect of the twenty-second aspect, refer to the technical effect of the twentieth aspect. Details are not described herein again.

DESCRIPTION OF EMBODIMENTS

For ease of understanding solutions in the embodiments of this application, related concepts are first briefly described as follows:

(1) PDU Session:

The PDU session is an association between a terminal device and a data network (DN), and is used to provide a PDU connection service.

(2) QoS Parameter:

The QoS parameter in the embodiments of this application includes one or more of the following parameters:

1. 5G QoS Identifier (5QI)

The 5QI is a scalar used to index a 5G QoS characteristic. The 5QIs include a standardized 5QI, a preconfigured 5QI, and a dynamically allocated 5QI. The standardized 5QIs are in a one-to-one correspondence with a group of standardized 5G QoS characteristic values. A 5G QoS characteristic value corresponding to the preconfigured 5QI is preconfigured on an access network device. A 5G QoS characteristic corresponding to the dynamically allocated 5QI is sent by a core network device to the access network device by using a QoS profile.

2. Allocation and Retention Priority (ARP)

The ARP includes a priority level, a preemption capability, and a preemption vulnerability.

3. Guaranteed flow bit rate (GFBR)

The GFBR represents a bit rate that is expected to be provided for a guaranteed bit rate (GBR) QoS flow.

4. Maximum Flow Bit Rate (MFBR)

The MFBR is used to limit a bit rate provided for a GBR QoS flow, namely, a maximum bit rate provided for the GBR QoS flow. If the bit rate is exceeded, a data packet can be discarded.

5. Reflective QoS Attribute (RQA)

The RQA is used to indicate a service transmitted through a corresponding QoS flow to use reflective QoS.

6. QNC

The QNC is used to indicate whether an access network device notifies a network in a use period of a QoS flow when a GFBR cannot be met.

Figure 1:
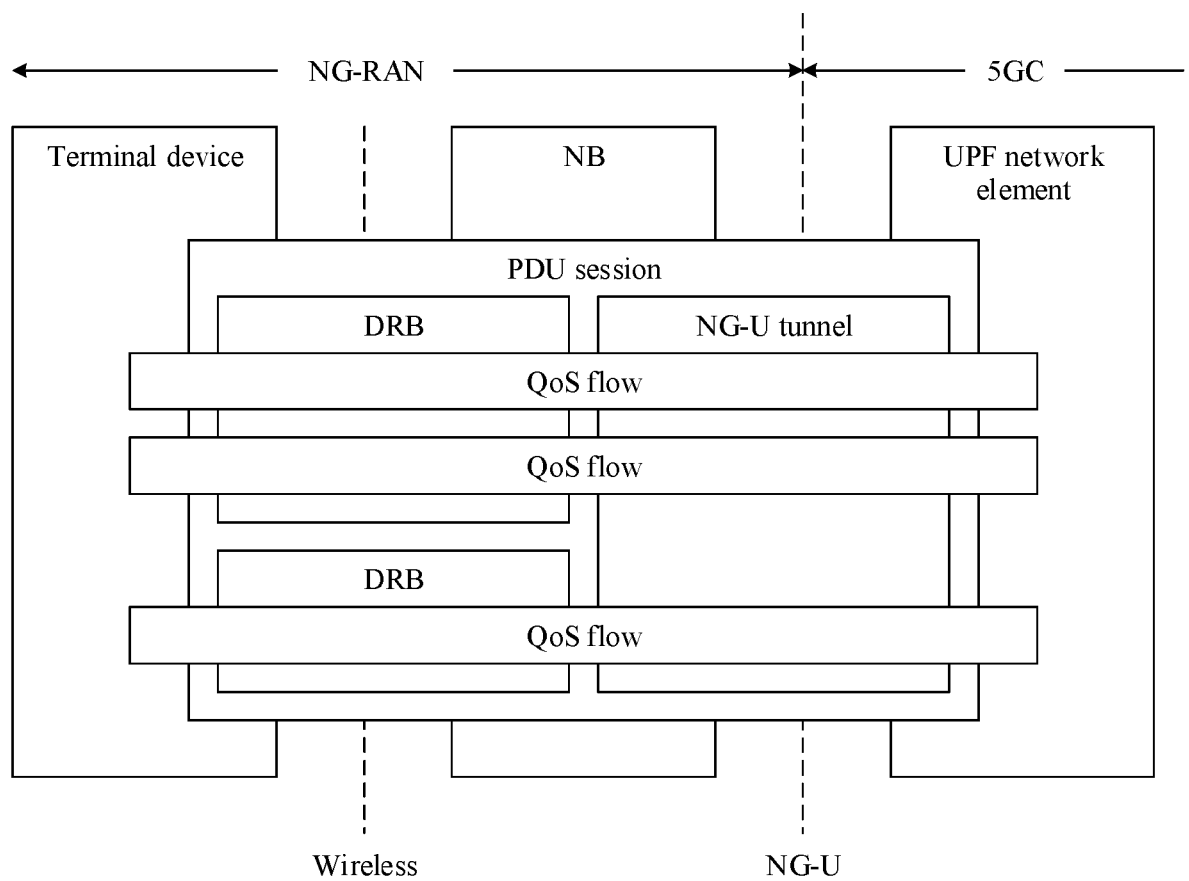
FIG. 1 shows an existing 5G QoS model.

(3) QoS Model:

In a 5G system, to ensure end-to-end quality of service of a service, a 5G QoS model based on a QoS flow is proposed, and is shown in FIG. 1. The 5G QoS model supports a guaranteed bit rate QoS flow (namely, a GBR QoS flow) and a non-guaranteed bit rate QoS flow (namely, a non-GBR (non-GBR) QoS flow). Same transmission processing (such as scheduling or an admission threshold) is performed on data packets controlled by a same QoS flow.

As shown in FIG. 1, a terminal device may establish one or more PDU sessions with a 5G network. One or more QoS flows can be established in each PDU session. Each QoS flow is identified by a QoS flow identifier (QFI), and the QFI uniquely identifies a QoS flow in a session. In addition, each QoS flow corresponds to one data radio bearer (DRB), and one DRB may correspond to one or more QoS flows.

Whether a QoS flow is a GBR QoS flow or a non-GBR QoS flow is determined based on a corresponding QoS profile.

A QoS profile corresponding to the GBR QoS flow needs to include the following QoS parameters: a 5QI, an ARP, a GFBR, and an MFBR, and optionally, includes QNC. Based on whether the QoS profile includes the QNC, the GBR QoS flows include a GRB QoS flow that requires notification control and a GBR QoS flow that does not require notification control. For the GBR QoS flow that requires notification control, when an access network device detects that a corresponding QoS flow resource cannot be met, the access network device notifies a session management function (SMF) network element of the event. Further, the SMF network element may initiate a QoS flow deletion or modification procedure.

A QoS file corresponding to the non-GBR QoS flow needs to include the following QoS parameters: a 5QI and an ARP, and optionally, includes an RQA.

Figure 2:
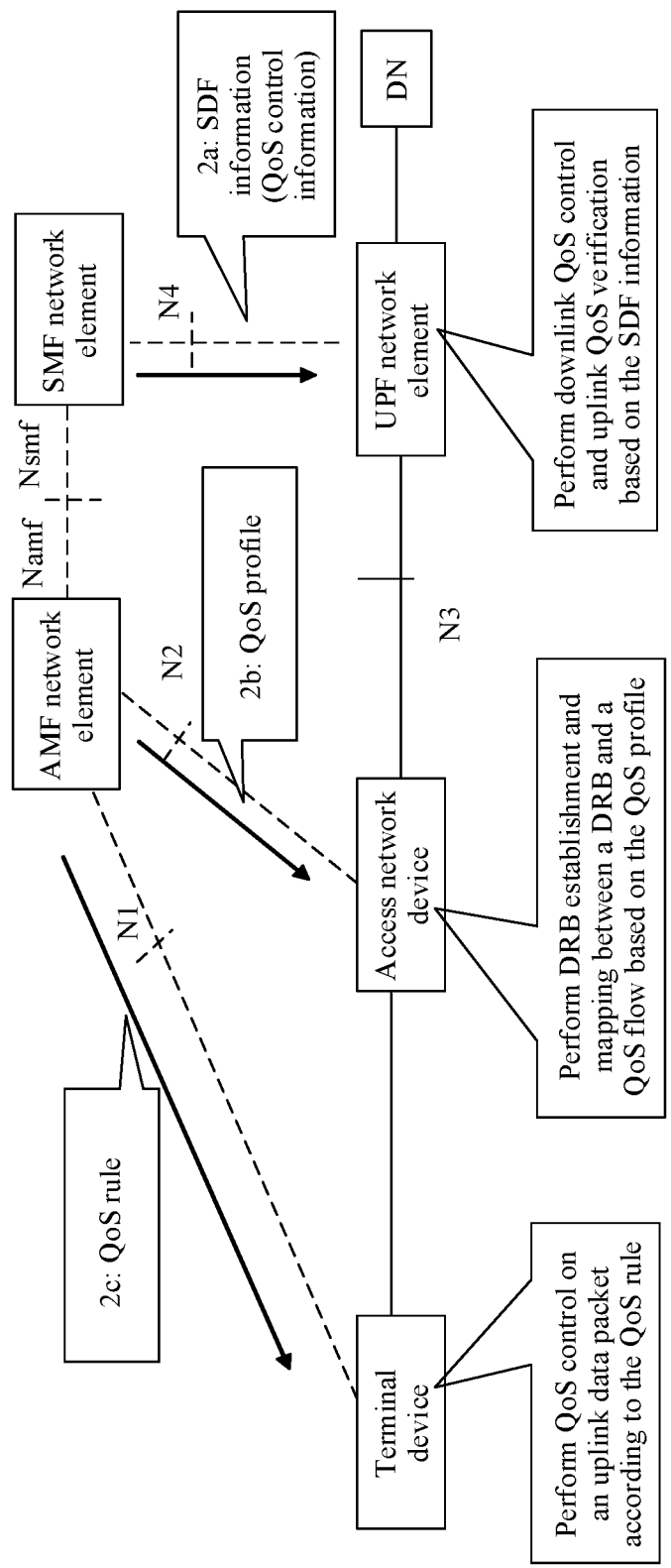
FIG. 2 is a schematic diagram of an existing architecture of establishing a signaling-based QoS flow.

In addition, the GBR QoS flow is mainly controlled in a signaling-based manner. A corresponding QoS flow establishment procedure is shown in FIG. 2, and includes the following steps:

Step 1: The SMF network element determines, according to a local policy or a PCC rule sent by a PCF network element, to establish a QoS flow. In this case, details are as follows: 2a: The SMF network element sends SDF information to a user plane function (UPF) network element, where the SDF information includes QoS control information. 2b: The SMF network element sends a QoS profile of the QoS flow to the access network device by using an access and mobility management function (aAMF) network element. 2c: The SMF network element sends a QoS rule to the terminal device by using the AMF network element and the access network device, where the QoS rule includes QoS control information.

Step 2: The terminal device, the access network device, and the UPF network element establish a QoS flow. The access network device establishes an air interface DRB based on the QoS profile, and stores a binding relationship between the QoS flow and the DRB.

For downlink, when receiving a downlink data packet, the UPF network element uses a data packet header of the downlink data packet to carry a QFI based on the SDF information sent by the SMF network element. When receiving a downlink data packet, the access network device places the downlink data packet on a corresponding DRB for transmission based on the QFI in the data packet header and the corresponding binding relationship between the QoS flow and the DRB.

For uplink, when determining to send an uplink data packet, the terminal device determines a QoS flow according to a QoS rule, uses a data packet header of the to-be-sent uplink data packet to carry a QFI, and places the uplink data packet on a corresponding DRB for transmission based on the binding relationship between the QoS flow and the DRB. When receiving the uplink data packet, the access network device uses a data packet header of an uplink data packet between the access network device and the UPF network element to carry a QFI based on the QFI in the data packet header. When receiving the uplink data packet sent by the access network device, the UPF network element verifies whether the data packet is transmitted through a correct QoS flow.

(4) Binding Parameter:

1. 5QI: For related descriptions, refer to the foregoing QoS parameter part. Details are not described herein again.

2. ARP: For related descriptions, refer to the foregoing QoS parameter part. Details are not described herein again.

Alternatively, optionally, if the PCC rule includes one or more of the following parameters, the one or more of the following parameters may also be used as the binding parameter:

3. QNC: For related descriptions, refer to the foregoing QoS parameter part. Details are not described herein again.

4. A priority level: The priority level indicates a priority in scheduling resources among QoS flows. The priority level is used to distinguish between QoS flows from a same terminal device, and is further used to distinguish between QoS flows from different terminal devices.

5. Averaging window: The averaging window is used for only a GBR QoS flow and represents duration over which a GFBR and an MFBR are calculated.

6. MDBV: The MDBV represents a largest amount of data that is required to be served by a 5G access network within a packet delay budget (PDB). The PDB defines an upper limit of a time that can be delayed for transmitting a data packet between a terminal device and a UPF network element with an N6 interface.

Certainly, the priority level, the averaging window, or the maximum data burst volume may alternatively be a parameter in a QoS attribute corresponding to the 5QI. This is not specifically limited herein.

(5) Multi-Level PCC Rule:

To reduce signaling interworking caused by a QoS change, the multi-level PCC rule is introduced. After a PCF network element delivers a multi-level PCC rule, a radio access network (RAN) device or an SMF network element independently upgrades or degrades QoS based on a network status (for example, congestion).

An example of the multi-level PCC rule provided in the embodiments of this application may be as follows:

The multi-level PCC rule includes, e.g.:

Parameter set 1={rank 1: 5QI value=x1, ARP value=y1, MFBR=z1} (i.e. highest QoS level);

Parameter set 2={rank 2: 5QI value=x2, ARP value=y2, MFBR=z2} (i.e. medium QoS level); and Parameter set 3={rank 3: 5QI value=x3, ARP value=y3, MFBR=z3} (i.e. lowest QoS level).

The SMF network element may generate, based on the multi-level PCC rule, a "special" QoS flow with a plurality of QoS profiles. An example is as follows:

The new type of QoS flow includes, e.g.:

QoS profile 1={rank 1: 5QI value=x1, RN, GBR=y1, MFBR=z1} (i.e. highest QoS level);

QoS profile 2={rank 2: 5QI value=x2, RN, GBR=y2, MFBR=z2} (i.e. medium QoS level); and QoS profile 3={rank 3: 5QI value=x3, RN, GBR=y3, MFBR=z3} (i.e. lowest QoS level).

It should be noted that the multi-level PCC rule in the embodiments of this application is a PCC rule (PCC rule with alternative QoS parameter sets) with an alternative parameter group. Unified descriptions are provided herein. Details are not described below.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference. In addition, in the embodiments of this application, a word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word "example", "for example", or the like is intended to present a relative concept in a specific manner for ease of understanding.

In addition, a network architecture and a service scenario that are described in the embodiments of this application are intended to describe the technical solutions in the embodiments of this application more clearly and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 3:
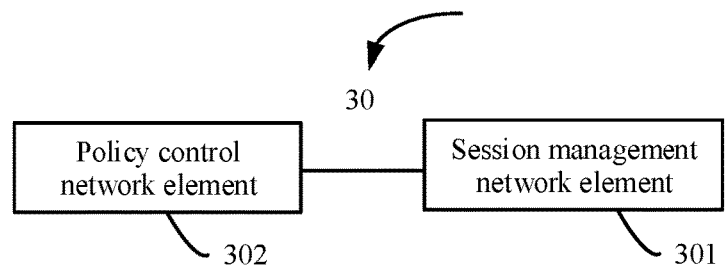
FIG. 3 is a schematic architectural diagram of a communications system according to an embodiment of this application.

FIG. 3 shows a communications system 30 according to an embodiment of this application. The communications system 30 includes a session management network element 301 and a policy control network element 302.

In a possible implementation, the policy control network element 302 sends a first PCC rule to the session management network element 301. The session management network element 301 receives the first PCC rule from the policy control network element 302. The first PCC rule includes a binding parameter, and a binding parameter at leach level in the binding parameter corresponds to one rank value. The session management network element 302 determines, from a PCC rule bound to an existing QoS flow, whether there is a PCC rule in which a binding parameter corresponding to each of all rank values is the same as a binding parameter that is in the first PCC rule and that corresponds to a same rank value in all rank values. If there is the PCC rule, the session management network element 301 binds the first PCC rule to the existing QoS flow; or if there is no such PCC rule, the session management network element 301 creates a QoS flow according to the first PCC rule, and binds the first PCC rule to the created QoS flow. A specific implementation of the solution is described in detail in a subsequent method embodiment. Details are not described herein. Based on this solution, in this embodiment of this application, only the PCC rule in which the binding parameter corresponding to each of all the rank values is the same as the binding parameter corresponding to the same rank value in all the rank values in the first PCC rule can be bound to a same QoS flow. This avoids a problem that a multi-level PCC rule and a single-level PCC rule that have a same binding parameter are bound to a same QoS flow, or that multi-level PCC rules having a same binding parameter but different ranks are bound to a same QoS flow, thereby further avoiding incorrect scheduling by a RAN device.

In another possible implementation, the policy control network element 302 sends a first PCC rule to the session management network element 301. The session management network element 301 receives the first PCC rule from the policy control network element 302. The session management network element 301 determines, from a PCC rule bound to an existing QoS flow, whether there is a PCC rule in which binding parameters at each level are the same as binding parameters at each level in the first PCC rule respectively. If there is the PCC rule, the session management network element 301 binds the first PCC rule to the existing QoS flow; or if there is no such PCC rule, the session management network element 301 creates a QoS flow according to the first PCC rule, and binds the first PCC rule to the created QoS flow. A specific implementation of the solution is described in detail in a subsequent method embodiment. Details are not described herein. Based on this solution, in this embodiment of this application, only the PCC rule in which the binding parameters at each level are the same as the binding parameters at each level in the first PCC rule respectively can be bound to a same QoS flow. This avoids a problem that a multi-level PCC rule and a single-level PCC rule that have a same binding parameter are bound to a same QoS flow, or that multi-level PCC rules having a same binding parameter but different ranks are bound to a same QoS flow, thereby further avoiding incorrect scheduling by a RAN device.

In still another possible implementation, the policy control network element 302 sends a first PCC rule to the session management network element 301. The session management network element 301 receives the first PCC rule from the policy control network element 302. After determining that the first PCC rule is a multi-level PCC rule, the session management network element 301 creates a QoS flow according to the first PCC rule and binds the first PCC rule to the created QoS flow, where the QoS flow is bound to only the first PCC rule. A specific implementation of the solution is described in detail in a subsequent method embodiment. Details are not described herein. Based on this solution, in this embodiment of this application, each multi-level PCC rule is bound to a different QoS flow. This avoids a problem that a multi-level PCC rule and a single-level PCC rule that have a same binding parameter are bound to a same QoS flow, or that multi-level PCC rules having a same binding parameter but different ranks are bound to a same QoS flow, thereby further avoiding incorrect scheduling by a RAN device.

In yet another possible implementation, the policy control network element 302 sends the first PCC rule to the session management network element 301. The session management network element 301 receives the first PCC rule from the policy control network element 302. The session management network element 301 determines that the first PCC rule needs to be bound to a separate QoS flow. The session management network element 301 creates a QoS flow according to the first PCC rule, and binds the first PCC rule to the created QoS flow. A specific implementation of the solution is described in detail in a subsequent method embodiment. Details are not described herein. Based on this solution, in this embodiment of this application, each multi-level PCC rule is bound to a different QoS flow. This avoids a problem that a multi-level PCC rule and a single-level PCC rule that have a same binding parameter are bound to a same QoS flow, or that multi-level PCC rules having a same binding parameter but different ranks are bound to a same QoS flow, thereby further avoiding incorrect scheduling by a RAN device.

In still yet another possible implementation, the policy control network element 302 is configured to send a first PCC rule to the session management network element 301, where the first PCC rule includes a binding parameter. The session management network element 301 is configured to: receive the first PCC rule from the policy control network element 302 and determine, from an existing QoS flow, whether there is a QoS flow for which a binding parameter is the same as the binding parameter in the first PCC rule. The session management network element 301 is further configured to: if the session management network element 301 determines that there is the QoS flow, bind the first PCC rule to the existing QoS flow; or if the session management network element 301 determines that there is no such QoS flow, create a QoS flow according to the first PCC rule, and bind the first PCC rule to the created QoS flow. In this embodiment of this application, only a PCC rule for which a binding parameter is the same as the binding parameter in the first PCC rule can be bound to a same QoS flow. This avoids a problem that a multi-level PCC rule and a single-level PCC rule that have a same binding parameter are bound to a same QoS flow, thereby further avoiding incorrect scheduling by a RAN device.

In still yet another possible implementation, the policy control network element 302 is configured to send a first PCC rule to the session management network element 301, where the first PCC rule includes a first binding parameter. The session management network element 301 is configured to receive the first PCC rule from the policy control network element 302. The session management network element 301 is further configured to: when determining that the first PCC rule includes an alternative quality of service QoS parameter set; and in a PCC rule bound to an existing first QoS flow, there is a second PCC rule in which a value of the first binding parameter is the same as a value of the first binding parameter included in the first PCC rule, and the second PCC rule includes an alternative QoS parameter set, bind the first PCC rule to the existing first QoS flow. Alternatively, the session management network element 301 is further configured to: when determining that the first PCC rule does not include an alternative QoS parameter set; and in a PCC rule bound to an existing second QoS flow, there is a third PCC rule in which a value of the first binding parameter is the same as a value of the first binding parameter included in the first PCC rule, and the third PCC rule does not include an alternative QoS parameter set, bind the first PCC rule to the existing second QoS flow. In other words, in this embodiment of this application, when other binding parameters in PCC rules are the same, one or more PCC rules that include alternative QoS parameter sets may be considered as PCC rules having a same binding parameter and one or more PCC rules that do not include alternative QoS parameter sets may be considered as PCC rules having a same binding parameter. Further, the one or more PCC rules having the same binding parameter can be bound to a same QoS flow, and the one or more PCC rules having the different binding parameters cannot be bound to a same QoS flow. This avoids a problem that a multi-level PCC rule and a single-level PCC rule that have a same binding parameter are bound to a same QoS flow, thereby further avoiding incorrect scheduling by a RAN device.

Optionally, the communications system 30 shown in FIG. 3 may be applied to a 5th generation (5G) network currently discussed, another future network, or the like. This is not specifically limited in this embodiment of this application.

Figure 4A:
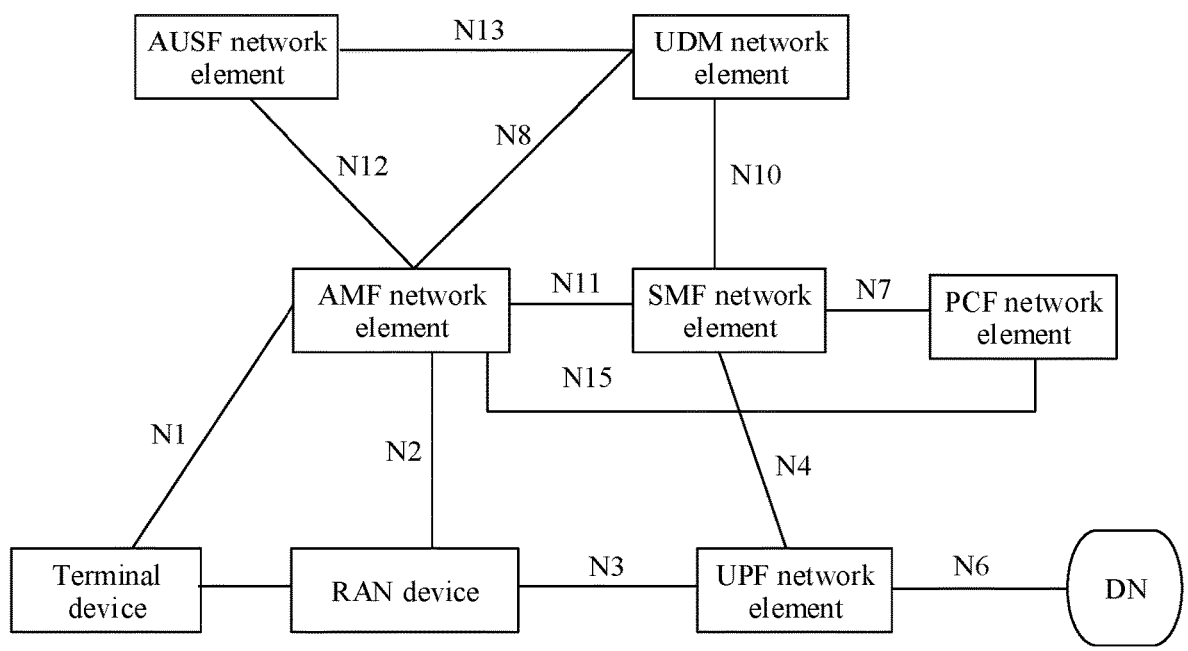
FIG. 4a shows a 5G network architecture 1 in a non-roaming scenario according to an embodiment of this application.

For example, assuming that the communications system 30 shown in FIG. 3 is applied to a 5G network architecture in a non-roaming scenario, as shown in FIG. 4a, a network element or an entity corresponding to the session management network element 301 may be an SMF network element in the non-roaming 5G network architecture, and a network element or an entity corresponding to the policy control network element 302 may be a PCF network element in the non-roaming 5G network architecture.

In addition, as shown in FIG. 4a, the non-roaming 5G network architecture may further include a RAN device, a UPF network element, an AMF network element, a unified data management (UDM) network element, an authentication server function (AUSF) network element, or the like. This is not specifically limited in this embodiment of this application.

A terminal device communicates with the AMF network element through a next generation (N) 1 interface (N1 for short). The RAN device communicates with the AMF network element through an N2 interface, and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the PCF network element through an N15 interface (N15 for short). The SMF network element communicates with the PCF network element through an N7 interface (N7 for short), the SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short).

Figure 4B:
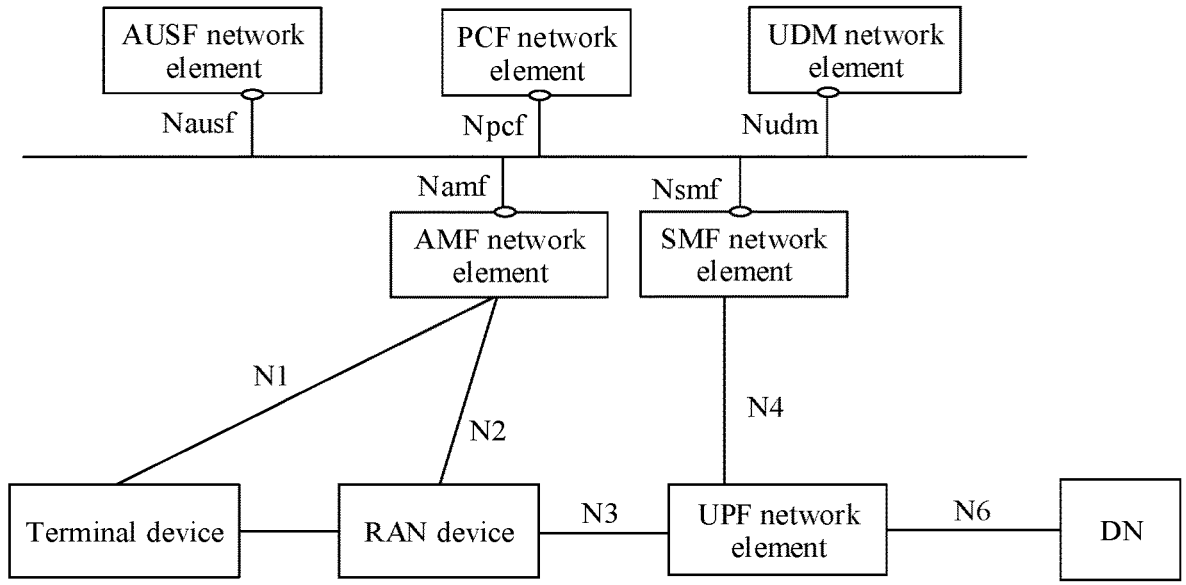
FIG. 4b shows a 5G network architecture 2 in a non-roaming scenario according to an embodiment of this application.

In addition, it should be noted that control plane network elements such as the AMF network element, the SMF network element, the UDM network element, the AUSF network element, and the PCF network element in the non-roaming 5G network architecture shown in FIG. 4a may alternatively interact with each other through a service-oriented interface. For example, as shown in FIG. 4b, an external service-oriented interface provided by the AMF network element may be an Namf interface, an external service-oriented interface provided by the SMF network element may be an Nsmf interface, an external service-oriented interface provided by the UDM network element may be an Nudm interface, an external service-oriented interface provided by the PCF network element may be an Npcf interface, and an external service-oriented interface provided by the AUSF network element may be an Nausf interface. For related descriptions, refer to a 5G system architecture in the standard TS 23.501. Details are not described herein.

Figure 5A:
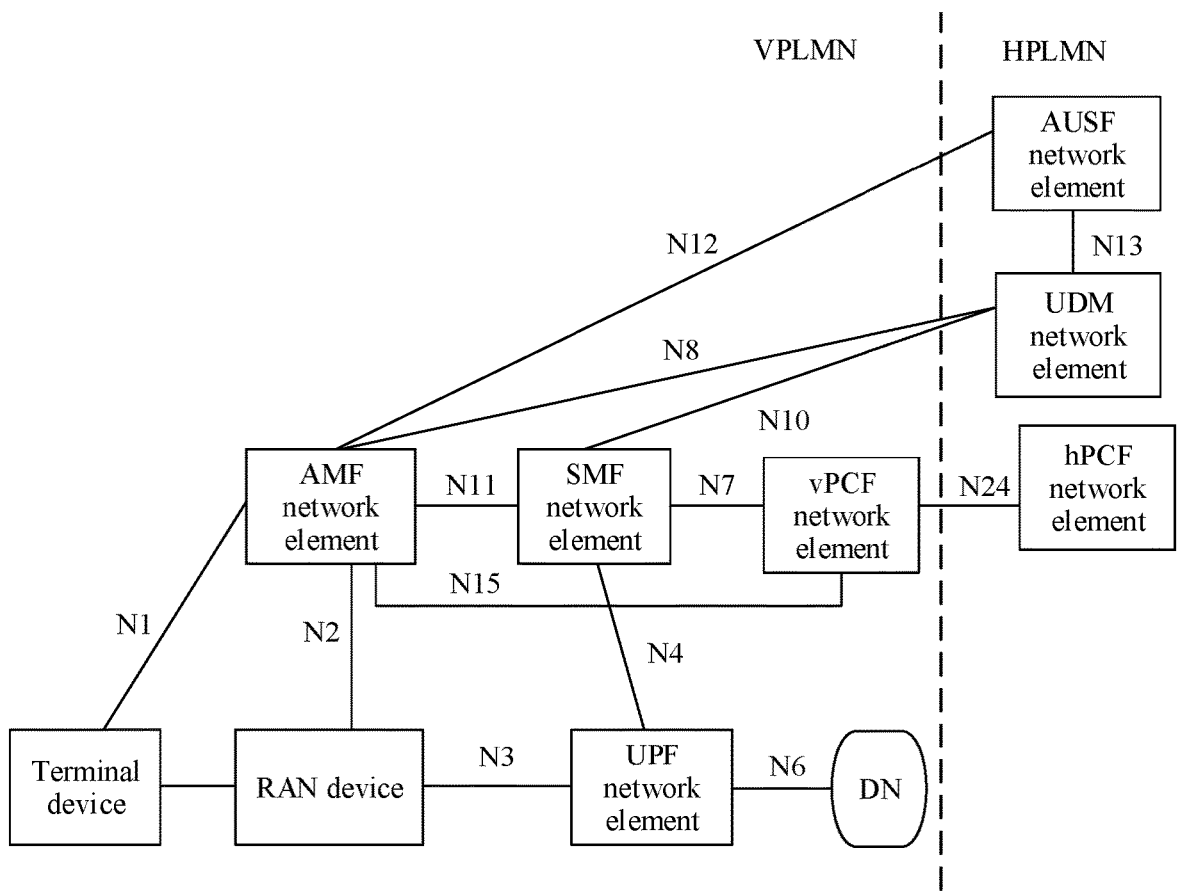
FIG. 5a shows a 5G network architecture 1 in a local breakout roaming scenario according to an embodiment of this application.

Alternatively, for example, assuming that the communications system 30 shown in FIG. 3 is applied to a 5G network architecture in a local breakout roaming scenario, as shown in FIG. 5a, a network element or an entity corresponding to the session management network element 301 may be an SMF network element in the local breakout roaming 5G network architecture, and a network element or an entity corresponding to the policy control network element 302 may be a visited PCF (vPCF) network element in the local breakout roaming 5G network architecture.

In addition, as shown in FIG. 5a, the local breakout roaming 5G network architecture may further include a RAN device, a UPF network element, an AMF network element, a UDM network element, a home PCF (hPCF) network element, an AUSF network element, or the like. This is not specifically limited in this embodiment of this application. The UDM network element, the AUSF network element, and the hPCF network element belong to a home public land mobile network (HPLMN). The RAN device, the AMF network element, the SMF network element, the UPF network element, or the vPCF network element belongs to a visited public land mobile network (VPLMN).

A terminal device communicates with the AMF network element through an N1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The SMF network element communicates with the vPCF network element through an N7 interface (N7 for short). The vPCF network element communicates with the hPCF network element through an N24 interface (N24 for short). The SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short).

Figure 5B:
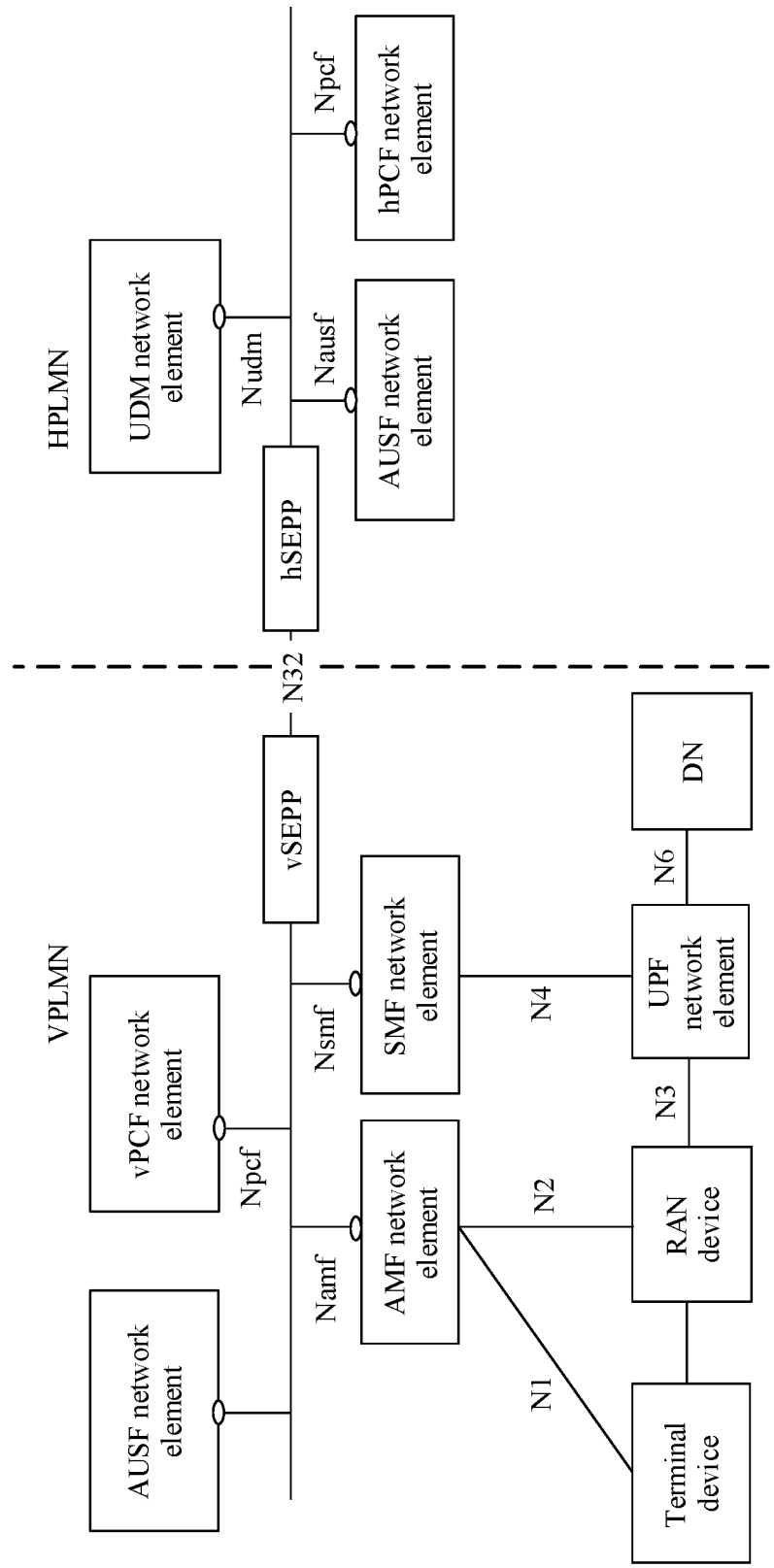
FIG. 5b shows a 5G network architecture 2 in a local breakout roaming scenario according to an embodiment of this application.

In addition, it should be noted that control plane network elements such as the AMF network element, the SMF network element, the UDM network element, the AUSF network element, the vPCF network element, and the hPCF network element in the local breakout roaming 5G network architecture shown in FIG. 5a may alternatively interact with each other through a service-oriented interface. For example, as shown in FIG. 5b, an external service-oriented interface provided by the AMF network element may be an Namf interface, an external service-oriented interface provided by the SMF network element may be an Nsmf interface, an external service-oriented interface provided by the UDM network element may be an Nudm interface, an external service-oriented interface provided by the vPCF network element may be an Npcf interface, an external service-oriented interface provided by the hPCF network element may be an Npcf interface, and an external service-oriented interface provided by the AUSF network element may be an Nausf interface. In addition, a visited security edge protection agent (vSEPP) in FIG. 5b is configured to perform information filtering, policy control, topology hiding, and the like on a control plane interface in the VPLMN. A home security edge protection proxy (hSEPP) in FIG. 5b is configured to perform information filtering, policy control, topology hiding, and the like on a control plane interface in the HPLMN. The vSEPP is connected to the hSEPP through an N32 interface (N32 for short). For all related descriptions, refer to a 5G system architecture in the standard TS 23.501. Details are not described herein.

Figure 6A:
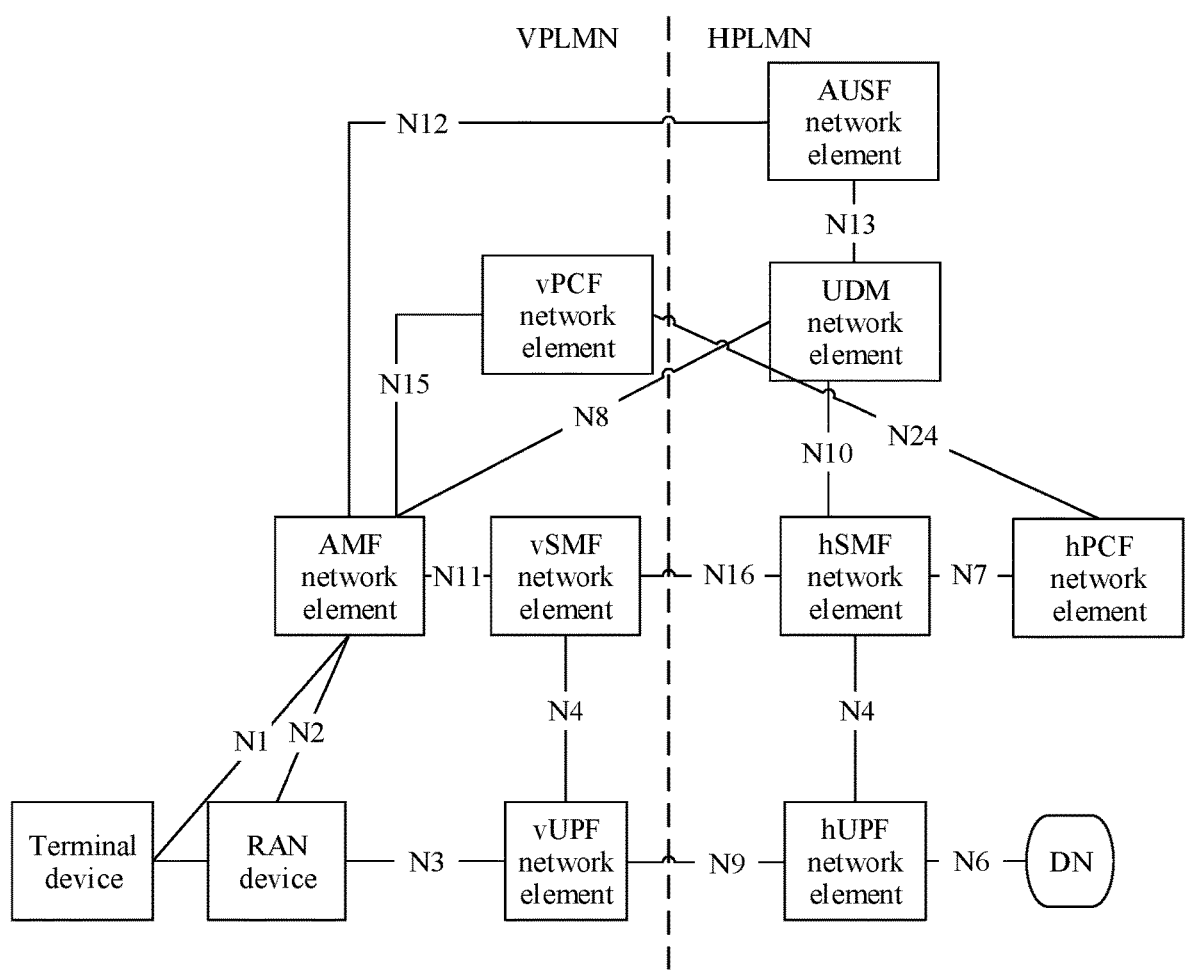
FIG. 6a shows a 5G network architecture 1 in a home routed roaming scenario according to an embodiment of this application.

Alternatively, for example, assuming that the communications system 30 shown in FIG. 3 is applied to a 5G network architecture in a home routed roaming scenario, as shown in FIG. 6a, a network element or an entity corresponding to the session management network element 301 may be a home SMF (hSMF) network element in the home routed roaming 5G network architecture and a network element or an entity corresponding to the policy control network element 302 may be an hPCF network element in the home routed roaming 5G network architecture.

In addition, as shown in FIG. 6a, the home routed roaming 5G network architecture may further include a RAN device, a home UPF (hUPF) network element, a visited UPF (vUPF) network element, a visited SMF (vSMF) network element, an AMF network element, a UDM network element, a vPCF network element, an AUSF network element, or the like. This is not specifically limited in this embodiment of this application. The UDM network element, the AUSF network element, the hSMF network element, the hPCF network element, or the hUPF network element belongs to an HPLMN. The RAN device, the AMF network element, the vSMF network element, the vUPF network element, or the vPCF network element belongs to a VPLMN.

A terminal device communicates with the AMF network element through an N1 interface (N1 for short). The RAN device communicates with the AMF network element through an N2 interface (N2 for short), and the RAN device communicates with the vUPF network element through an N3 interface (N3 for short). The vUPF network element communicates with the hUPF network element through an N9 interface (N9 for short). The hUPF network element communicates with a DN through an N6 interface (N6 for short). The AMF network element communicates with the vSMF network element through an N11 interface (N11 for short). The vSMF network element communicates with the hSMF network element through an N16 interface (N16 for short). The AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The vPCF network element communicates with the hPCF network element through an N24 interface (N24 for short). The vSMF network element communicates with the vUPF network element through an N4 interface (N4 for short). The hSMF network element communicates with the hUPF network element through an N4 interface (N4 for short), the hSMF network element communicates with the UDM network element through an N10 interface (N10 for short), and the hSMF network element communicates with the hPCF network element through an N7 interface (N7 for short). The UDM network element communicates with the AUSF network element through an N13 interface (N13 for short).

Figure 6B:
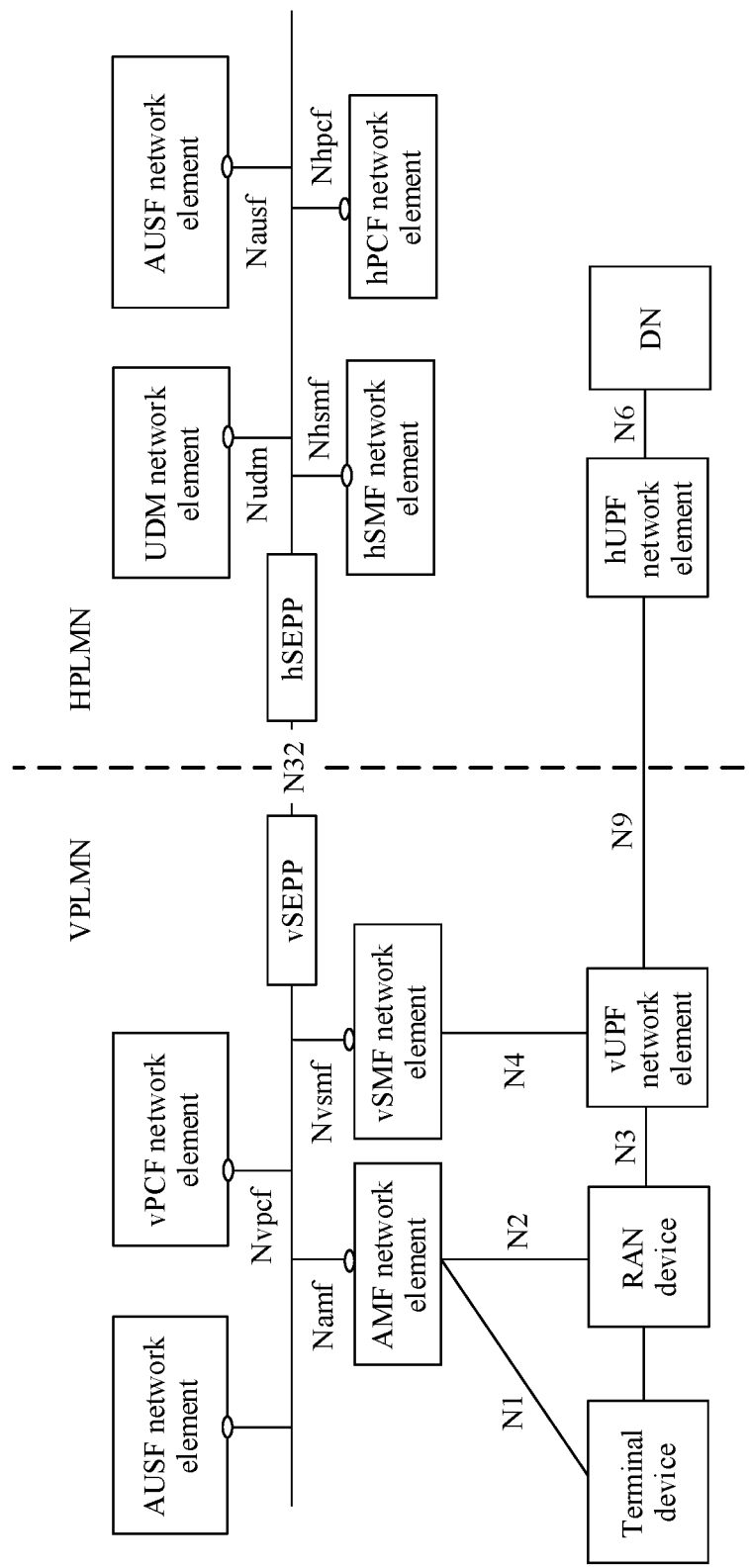
FIG. 6b shows a 5G network architecture 2 in a home routed roaming scenario according to an embodiment of this application.

In addition, it should be noted that control plane network elements such as the AMF network element, the vSMF network element, the hSMF network element, the UDM network element, the AUSF network element, the vPCF network element, and the hPCF network element in the home routed roaming 5G network architecture shown in FIG. 6a may alternatively interact with each other through a service-oriented interface. For example, as shown in FIG. 6b, an external service-oriented interface provided by the AMF network element may be an Namf interface, an external service-oriented interface provided by the vSMF network element may be an Nvsmf interface, an external service-oriented interface provided by the hSMF network element may be an Nhsmf interface, an external service-oriented interface provided by the UDM network element may be an Nudm interface, an external service-oriented interface provided by the vPCF network element may be an Nvpcf interface, an external service-oriented interface provided by the hPCF network element may be an Nhpcf interface, and an external service-oriented interface provided by the AUSF network element may be an Nausf interface. In addition, a vSEPP in FIG. 6b is configured to perform information filtering, policy control, topology hiding, and the like on a control plane interface in the VPLMN. An hSEPP in FIG. 6b is configured to perform information filtering, policy control, topology hiding, and the like on a control plane interface in the HPLMN. The vSEPP is connected to the hSEPP through an N32 interface (N32 for short). For all related descriptions, refer to a 5G system architecture in the standard TS 23.501. Details are not described herein.

Optionally, the terminal device in this embodiment of this application may be a device such as a terminal or a chip that may be used in a terminal, configured to implement a wireless communication function. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or in a fixed position.

Optionally, the RAN device in this embodiment of this application is a device that accesses a core network, for example, may be a base station, a broadband network gateway (BNG), an aggregation switch, or a non-3rd generation partnership project (3GPP) access device. The base station may include base stations in various forms, for example, a macro base station, a micro base station (also referred to as a small cell), a relay station, and an access point.

Optionally, the session management network element in this embodiment of this application may also be referred to as a communications apparatus, and may be a general-purpose device or a dedicated device. This is not specifically limited in this embodiment of this application.

Optionally, a related function of the session management network element in this embodiment of this application may be implemented by one device, or may be jointly implemented by a plurality of devices, or may be implemented by one or more function modules in one device. This is not specifically limited in this embodiment of this application. It may be understood that the foregoing function may be a function of a network element on a hardware device, or may be a function of software running on dedicated hardware, or may be a function of a combination of hardware and software, or may be a virtualization function instantiated on a platform (for example, a cloud platform).

Figure 7:
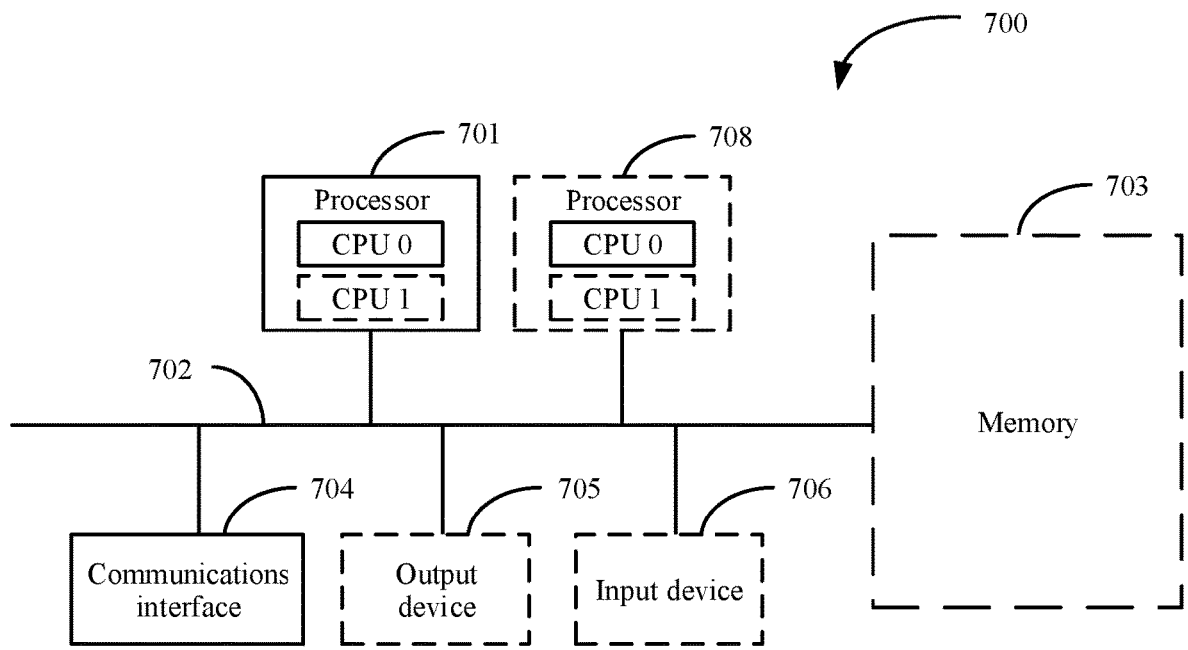
FIG. 7 is a schematic structural diagram of a communications device according to an embodiment of this application.

For example, the related function of the session management network element in this embodiment of this application may be implemented by a communications device 700 in FIG. 7. FIG. 7 is a schematic structural diagram of a communications device 700 according to an embodiment of this application. The communications device 700 includes one or more processors 701, a communications line 702, and at least one communications interface (only an example in which the communications device 700 includes a communications interface 704 and one processor 701 is used in FIG. 7 for description). Optionally, the communications device 700 may further include a memory 703.

The processor 701 may be a general-purpose central processing unit (CPU), a microprocessor, an application-specific integrated circuit (ASIC), or one or more integrated circuits configured to control program execution in the solutions of this application.

The communications line 702 may include a path, to connect different components.

The communications interface 704 may be a transceiver module configured to communicate with another device or a communications network, for example, the Ethernet, a RAN, or a wireless local area network (WLAN). For example, the transceiver module may be an apparatus such as a transceiver or a transceiver. Optionally, the communications interface 704 may alternatively be a transceiver circuit located inside the processor 701, and is configured to implement signal input and signal output of the processor.

The memory 703 may be an apparatus having a storage function. For example, the memory 703 may be a read-only memory (ROM) or another type of static storage device that can store static information and an instruction, or a random access memory (RAM) or another type of dynamic storage device that can store information and an instruction. The memory 703 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 703 is not limited thereto. The memory may exist independently and is connected to the processor through the communications line 702. The memory may alternatively be integrated into the processor.

The memory 703 is configured to store a computer execution instruction for executing the solutions of this application, and the processor 701 controls the execution. The processor 701 is configured to execute the computer execution instruction stored in the memory 703 to implement a charging rule binding method provided in the following embodiments of this application.

Alternatively, optionally, in this embodiment of this application, the processor 701 may perform processing related functions in a charging rule binding method provided in the following embodiments of this application, and the communications interface 704 is responsible for communicating with another device or a communications network. This is not specifically limited in this embodiment of this application.

Optionally, the computer execution instruction in this embodiment of this application may also be referred to as application program code. This is not specifically limited in this embodiment of this application.

In a specific implementation, in an embodiment, the processor 701 may include one or more CPUs, for example, a CPU 0 and a CPU 1 in FIG. 7.

In a specific implementation, in an embodiment, the communications device 700 may include a plurality of processors, for example, the processor 701 and a processor 708 in FIG. 7. Each of the processors may be a single-core processor (single-CPU) or a multi-core processor (multi-CPU). The processor herein may be one or more devices, circuits, and/or processing cores configured to process data (for example, a computer program instruction).

In a specific implementation, in an embodiment, the communications device 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, or a projector. The input device 706 communicates with the processor 701 and may receive an input of a user in a plurality of manners. For example, the input device 706 may be a mouse, a keyboard, a touchscreen device, or a sensing device.

The communications device 700 may also be referred to as a communications apparatus sometimes, and may be a general-purpose device or a dedicated device. For example, the communications device 700 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 7. A type of the communications device 700 is not limited in this embodiment of this application.

The following describes, in detail with reference to FIG. 3 to FIG. 7, the charging rule binding method provided in the embodiments of this application.

It should be noted that in the following embodiments of this application, names of messages between network elements, names of parameters in messages, or the like are merely examples, and there may be other names in a specific implementation. This is not specifically limited in this embodiment of this application.

Figure 8:
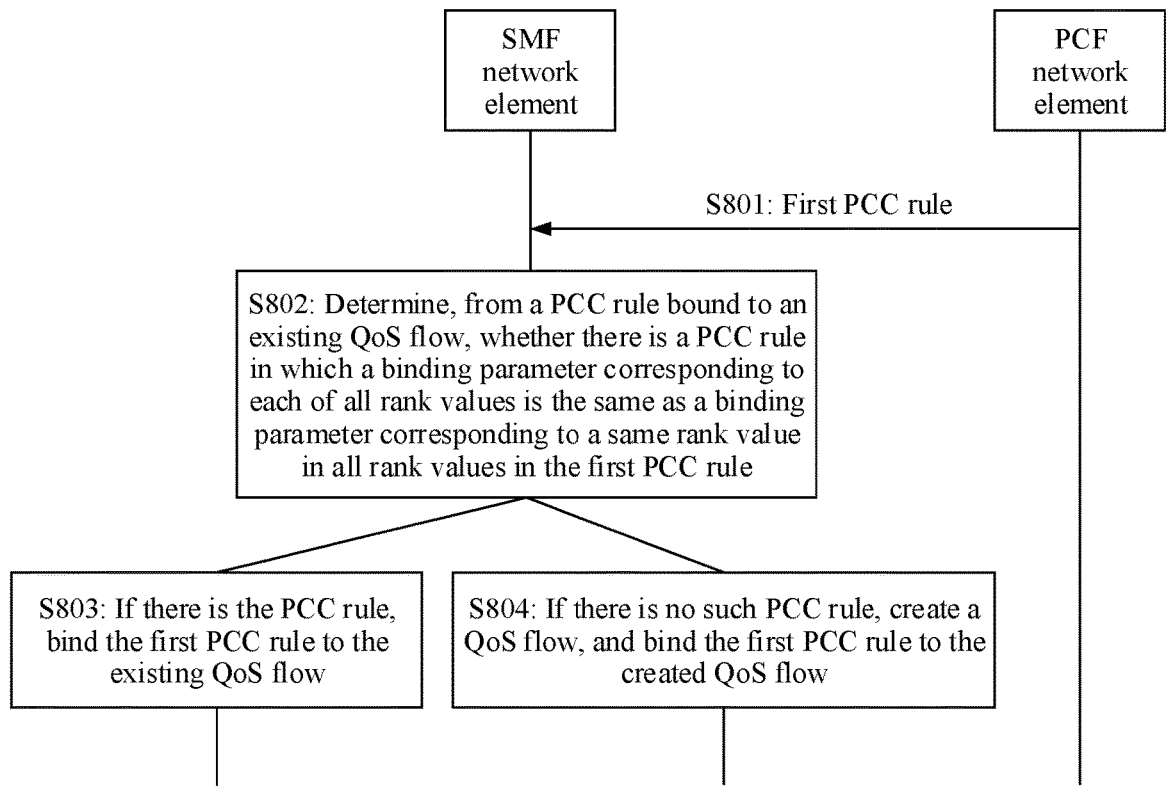
FIG. 8 is a schematic flowchart 1 of a charging rule binding method according to an embodiment of this application.

An example in which the communications system shown in FIG. 3 is applied to the 5G network architecture in the non-roaming scenario shown in FIG. 4a or FIG. 4b is first used. FIG. 8 shows a charging rule binding method according to an embodiment of this application. The charging rule binding method includes the following steps.

S801: A PCF network element sends a first PCC rule to an SMF network element. The SMF network element receives the first PCC rule from the PCF network element.

The first PCC rule includes a binding parameter, and a binding parameter at leach level in the binding parameter corresponds to one rank value.

Optionally, the first PCC rule in this embodiment of this application may be a single-level PCC rule or a multi-level PCC rule. This is not specifically limited in this embodiment of this application. For related descriptions of the multi-level PCC rule, refer to the foregoing part of the specific implementation. Details are not described herein again.

In a possible implementation, that a binding parameter at leach level in the binding parameter corresponds to one rank value includes: a binding parameter at leach level in the binding parameter includes the one rank value.

In other words, in this embodiment of this application, a binding parameter at each level includes a rank value, a 5QI, and an ARP. Optionally, if the PCC rule includes one or more of the following parameters, the one or more of the following parameters may also be used as the binding parameter: QNC, a priority level, an averaging window, or an MDBV. Certainly, the priority level, the averaging window, or the MDBV may alternatively be a parameter in a QoS attribute corresponding to the 5QI. This is not specifically limited herein.

For example, the first PCC rule may include:
Parameter set 1={rank 1: 5QI value=x1, ARP value=y1, GFBR=z1} (i.e. highest QoS level);
Parameter set 2={rank 2: 5QI value=x2, ARP value=y2, GFBR=z2} (i.e. medium QoS level); and
Parameter set 3={rank 3: 5QI value=x3, ARP value=y3, GFBR=z3} (i.e. lowest QoS level).

Correspondingly, a value of the binding parameter may include:
{rank 1: 5QI value=x1, ARP value=y1} (i.e. highest QoS level);
{rank 2: 5QI value=x2, ARP value=y2} (i.e. medium QoS level); and
{rank 3: 5QI value=x3, ARP value=y3} (i.e. lowest QoS level).

In another possible implementation, that a binding parameter at leach level in the binding parameter corresponds to one rank value includes: the first PCC rule further includes the rank value corresponding to a binding parameter at leach level in the binding parameter.

For example, the first PCC rule may include:
rank 1 (i.e. highest QoS level), and corresponding parameter set 1={rank 1: 5QI value=x1, ARP value=y1, GFBR=z1};
rank 2 (i.e. medium QoS level), and corresponding parameter set 2={rank 2: 5QI value=x2, ARP value=y2, GFBR=z2}; and
rank 3 (i.e. lowest QoS level), and corresponding parameter set 3={rank 3: 5QI value=x3, ARP value=y3, GFBR=z3}.

A rank value and a value of a corresponding binding parameter may include:
rank 1 (i.e. highest QoS level), and corresponding binding parameter {5QI value=x1, ARP value=y1};
rank 2 (i.e. medium QoS level), and corresponding binding parameter {5QI value=x2, ARP value=y2}; and
rank 3 (i.e. lowest QoS level), and corresponding binding parameter {5QI value=x3, ARP value=y3}.

Optionally, in this embodiment of this application, the single-level PCC rule may alternatively not include the rank value. This is not specifically limited in this embodiment of this application.

S802: The SMF network element determines, from a PCC rule bound to an existing QoS flow, whether there is a PCC rule in which a binding parameter corresponding to each of all rank values is the same as a binding parameter corresponding to a same rank value in all rank values in the first PCC rule.

For example, it is assumed that the first PCC rule (namely, a PCC rule 1) may include:
Parameter set 1={rank 1: 5QI value=x1, ARP value=y1, MFBR=z11}; and
Parameter set 2={rank 2: 5QI value=x2, ARP value=y2, MFBR=z21}.

Correspondingly, a value of the binding parameter may include:
{rank 1: 5QI value=x1, ARP value=y1}; and
{rank 2: 5QI value=x2, ARP value=y2}.

A PCC rule bound to an existing QoS flow 1 includes a PCC rule 2, and the PCC rule 2 may include:
Parameter set 1={rank 1: 5QI value=x1, ARP value=y1, GFBR=z12};
Parameter set 2={rank 2: 5QI value=x2, ARP value=y2, GFBR=z22}; and
Parameter set 3={rank 3: 5QI value=x3, ARP value=y3, GFBR=z32}.

Correspondingly, a value of the binding parameter may include:
{rank 1: 5QI value=x1, ARP value=y1};
{rank 2: 5QI value=x2, ARP value=y2}; and
{rank 3: 5QI value=x3, ARP value=y3}.

Alternatively, a PCC rule bound to an existing QoS flow 2 includes a PCC rule 3, and the PCC rule 3 may include:
Parameter set 1={rank 1: 5QI value=x1, ARP value=y1, MFBR=z13}.

Correspondingly, a value of the binding parameter may include:
{rank 1: 5QI value=x1, ARP value=y1}.

Alternatively, a PCC rule bound to an existing QoS flow 3 includes a PCC rule 4, and the PCC rule 4 may include:
Parameter set 1={rank 1: 5QI value=x1, ARP value=y1, GFBR=z14}; and Parameter set 2={rank 2: 5QI value=x2, ARP value=y2, GFBR=z24}.

Correspondingly, a value of the binding parameter may include:

{rank 1: 5QI value=x1, ARP value=y1}; and
{rank 2: 5QI value=x2, ARP value=y2}.

Therefore, it can be learned from the foregoing examples that in the PCC rule 2 bound to the existing QoS flow 1, although the binding parameter corresponding to rank 1 is the same as the binding parameter corresponding to rank 1 in the PCC rule 1, and the binding parameter corresponding to rank 2 is the same as the binding parameter corresponding to rank 2 in the PCC rule 1, the PCC rule 2 further includes the binding parameter corresponding to rank 3. Therefore, a binding parameter corresponding to each of all rank values in the PCC rule 2 is different from a binding parameter corresponding to a same rank value in all rank values in the PCC rule 1.

Alternatively, in the PCC rule 3 bound to the existing QoS flow 2, although the binding parameter corresponding to rank 1 is the same as the binding parameter corresponding to rank 1 in the PCC rule 1, the PCC rule 1 further includes the binding parameter corresponding to rank 2. Therefore, a binding parameter corresponding to each of all rank values in the PCC rule 2 is different from a binding parameter corresponding to a same rank value in all rank values in the PCC rule 1.

Alternatively, in the PCC rule 4 bound to the existing QoS flow 3, the binding parameter corresponding to rank 1 is the same as the binding parameter corresponding to rank 1 in the PCC rule 1, and the binding parameter corresponding to rank 2 is the same as the binding parameter corresponding to rank 2 in the PCC rule 1. Therefore, a binding parameter corresponding to each of all rank values in the PCC rule 2 is the same as a binding parameter corresponding to a same rank value in all rank values in the PCC rule 1.

It should be noted that in the examples provided in this application, an example in which one QoS flow is bound to one PCC rule is used for description. Certainly, in this embodiment of this application, one QoS flow may be bound to one or more PCC rules. Binding parameters corresponding to all of a plurality of PCC rules are the same. Therefore, in the descriptions in this embodiment of this application, that in the PCC rule bound to the existing QoS flow, a binding parameter corresponding to a rank is the same as or different from a binding parameter corresponding to a same rank in the first PCC rule may also be understood as that in a parameter of the existing QoS flow, a binding parameter corresponding to a rank is the same as or different from a binding parameter corresponding to a same rank in the first PCC rule. For example, that in the PCC rule 2 bound to the existing QoS flow 1, the binding parameter corresponding to rank 1 is the same as the binding parameter corresponding to rank 1 in the PCC rule 1 may also be understood as that in a parameter of the existing QoS flow 1, a binding parameter corresponding to rank 1 is the same as a binding parameter corresponding to rank 1 in the PCC rule 1. The description is further applicable to the embodiment shown in FIG. 9. Unified descriptions are provided herein. Details are not described below.

Further, in this embodiment of this application, if the SMF network element determines that there is the PCC rule in which the binding parameter corresponding to each of all the rank values is the same as the binding parameter that is in the first PCC rule and that corresponds to the same rank value in all the rank values, the SMF network element performs step S803. Alternatively, if the SMF network element determines that there is no such PCC rule in which the binding parameter corresponding to each of all the rank values is the same as the binding parameter that is in the first PCC rule and that corresponds to the same rank value in all the rank values, the SMF network element performs step S804.

S803: If there is the PCC rule, the SMF network element binds the first PCC rule to the existing QoS flow.

For example, with reference to the example in step S802, the SMF network element may bind the first PCC rule to the QoS flow 3. For a specific implementation of binding the first PCC rule to the QoS flow 3, refer to an existing binding mechanism. Details are not described herein.

S804: If there is no such PCC rule, the SMF network element creates a QoS flow according to the first PCC rule, and binds the first PCC rule to the created QoS flow.

Certainly, if there is no such PCC rule, in the PCC rule bound to the existing QoS flow, in which the binding parameter corresponding to each of all the rank values is the same as the binding parameter corresponding to the same rank value in all the rank values in the first PCC rule, the SMF network element creates the QoS flow according to the first PCC rule, and binds the first PCC rule to the created QoS flow. For a specific implementation of binding the first PCC rule to the created QoS flow, refer to an existing binding mechanism. Details are not described herein.

For example, assuming that the first PCC rule is shown in the example in step S802, the QoS flow created according to the first PCC rule may include:

QoS profile 1={rank 1: 5QI value=x1, ARP value=y1, MFBR=z11}; and
QoS profile 2={rank 2: 5QI value=x2, ARP value=y2, MFBR=z21}.

According to the charging rule binding method provided in this embodiment of this application, in this embodiment of this application, only the PCC rule in which the binding parameter corresponding to each of all the rank values is the same as the binding parameter corresponding to the same rank value in all the rank values in the first PCC rule can be bound to a same QoS flow. Therefore, a problem that a multi-level PCC rule and a single-level PCC rule that have a same binding parameter are bound to a same QoS flow, or multi-level PCC rules having a same binding parameter but different ranks are bound to a same QoS flow is avoided, thereby further avoiding incorrect scheduling by a RAN device.

The actions of the SMF network element in steps S801 to S803 or step S804 may be performed by the processor 701 in the communications device 700 shown in FIG. 7 by invoking the application program code stored in the memory 703. This is not limited in this embodiment.

Figure 9:
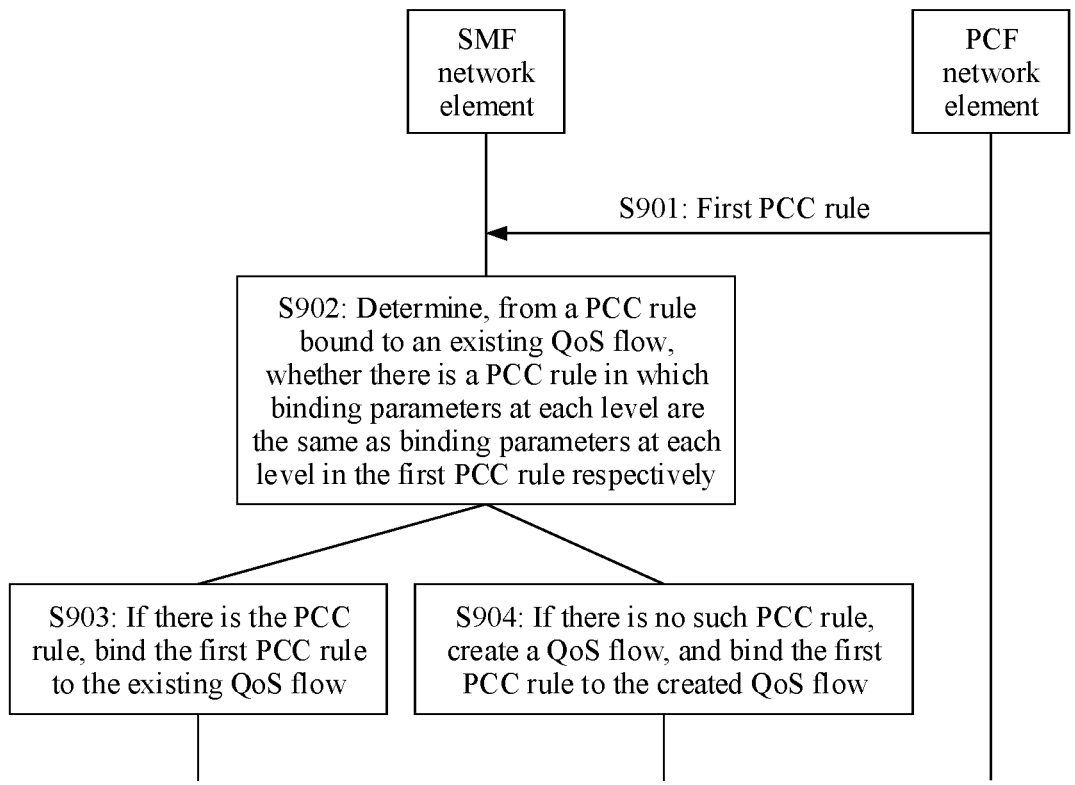
FIG. 9 is a schematic flowchart 2 of a charging rule binding method according to an embodiment of this application.

Alternatively, an example in which the communications system shown in FIG. 3 is applied to the 5G network architecture in the non-roaming scenario shown in FIG. 4a or FIG. 4b is used. FIG. 9 shows a charging rule binding method according to an embodiment of this application. The charging rule binding method includes the following steps.

S901: A PCF network element sends a first PCC rule to an SMF network element. The SMF network element receives the first PCC rule from the PCF network element.

Optionally, the first PCC rule in this embodiment of this application may be a single-level PCC rule or a multi-level PCC rule. This is not specifically limited in this embodiment of this application.

Optionally, in this embodiment of this application, a form of the first PCC rule may be the same as the form of the first PCC rule shown in step S801, or may be different from the form of the first PCC rule shown in step S801. This is not specifically limited herein.

S902: The SMF network element determines, from a PCC rule bound to an existing QoS flow, whether there is a PCC rule in which binding parameters at each level are the same as binding parameters at each level in the first PCC rule respectively.

Optionally, in this embodiment of this application, that the SMF network element determines, from a PCC rule bound to an existing QoS flow, whether there is a PCC rule in which binding parameters at each level are the same as binding parameters at each level in the first PCC rule respectively includes: The SMF network element determines, from the PCC rule bound to the existing QoS flow, whether there is a PCC rule for which a corresponding maximum rank value is the same as a maximum rank value corresponding to the first PCC rule. If there is a second PCC rule for which a corresponding maximum rank value is the same as the maximum rank value corresponding to the first PCC rule, and binding parameters at each level in the second PCC rule are the same as the binding parameters at each level in the first PCC rule respectively, the SMF network element determines, from the PCC rule bound to the existing QoS flow, that there is the PCC rule in which the binding parameters at each level are the same as the binding parameters at each level in the first PCC rule respectively; or if there is no such PCC rule for which a corresponding maximum rank value is the same as the maximum rank value corresponding to the first PCC rule, the SMF network element determines, from the PCC rule bound to the existing QoS flow, that there is no such PCC rule in which the binding parameters at each level are the same as the binding parameters at each level in the first PCC rule respectively.

For example, it is assumed that the first PCC rule (namely, a PCC rule 1) may include:
Parameter set 1={rank 1: 5QI value=x1, ARP value=y1, MFBR=z11}; and
Parameter set 2={rank 2: 5QI value=x2, ARP value=y2, MFBR=z21}.
Correspondingly, a value of the binding parameter may include:
value of a corresponding binding parameter: {rank 1: 5QI value=x1, ARP value=y1}; and
value of a corresponding binding parameter: {rank 2: 5QI value=x2, ARP value=y2}.

A PCC rule bound to an existing QoS flow 1 includes a PCC rule 2, and the PCC rule 2 may include:
Parameter set 1={rank 1: 5QI value=x1, ARP value=y1, GFBR=z12};
Parameter set 2={rank 2: 5QI value=x2, ARP value=y2, GFBR=z22}; and
Parameter set 3={rank 3: 5QI value=x3, ARP value=y3, GFBR=z32}.
Correspondingly, a value of the binding parameter may include:
value of a corresponding binding parameter: {rank 1: 5QI value=x1, ARP value=y1};
value of a corresponding binding parameter: {rank 2: 5QI value=x2, ARP value=y2}; and
value of a corresponding binding parameter: {rank 3: 5QI value=x3, ARP value=y3}.

Alternatively, a PCC rule bound to an existing QoS flow 2 includes a PCC rule 3, and the PCC rule 3 may include:
Parameter set 1={rank 1: 5QI value=x1, ARP value=y1, MFBR=z13}.
Correspondingly, a value of the binding parameter may include:
value of a corresponding binding parameter: {rank 1: 5QI value=x1, ARP value=y1}.

Alternatively, a PCC rule bound to an existing QoS flow 3 includes a PCC rule 4, and the PCC rule 4 may include:
Parameter set 1={rank 1: 5QI value=x1, ARP value=y1, GFBR=z14}; and
Parameter set 2={rank 2: 5QI value=x2, ARP value=y2, GFBR=z24}.
Correspondingly, a value of the binding parameter may include:
value of a corresponding binding parameter: {rank 1: 5QI value=x1, ARP value=y1}; and
value of a corresponding binding parameter: {rank 2: 5QI value=x2, ARP value=y2}.

Alternatively, a PCC rule bound to an existing QoS flow 4 includes a PCC rule 5, and the PCC rule 5 may include:
Parameter set 1={rank 1: 5QI value=x1, ARP value=y1, MDBV=c1, GFBR=z14}; and
Parameter set 2={rank 2: 5QI value=x2, ARP value=y2, MDBV=c2, GFBR=z24}.
Correspondingly, a value of the binding parameter may include:
value of a corresponding binding parameter: {rank 1: 5QI value=x1, ARP value=y1, MDBV=c1}; and
value of a corresponding binding parameter: {rank 2: 5QI value=x2, ARP value=y2, MDBV=c2}.

Therefore, it can be learned from the foregoing example that in the PCC rule bound to the existing QoS flow, maximum rank values corresponding to the PCC rule 4 bound to the existing QoS flow 3 and the PCC rule 5 bound to the existing QoS flow 4 are the same as a maximum rank value corresponding to the first PCC rule (namely, the PCC rule 1), and are both rank 2. However, because a binding parameter at each level in the PCC rule 5 includes the MDBV, but a binding parameter at each level in the first PCC rule does not include the MDBV, a binding parameter at each level in the PCC rule 5 is different from a binding parameter at each level in the first PCC rule, but binding parameters at each level in the PCC rule 4 are the same as binding parameters at each level in the first PCC rule respectively.

Optionally, in this embodiment of this application, the SMF network element may alternatively perform detection in sequence until a quantity of times reaches a maximum rank value. This is not specifically limited in this embodiment of this application.

Further, in this embodiment of this application, if the SMF network element determines that there is the PCC rule in which the binding parameters are the same as the binding parameters at each level in the first PCC rule respectively, the SMF network element performs step S903. Alternatively, if the SMF network element determines that there is no such PCC rule in which the binding parameters at each level are the same as the binding parameters at each level in the first PCC rule respectively, the SMF network element performs step S904.

S903: If there is the PCC rule, the SMF network element binds the first PCC rule to the existing QoS flow.

For example, with reference to the example in step S902, the SMF network element may bind the first PCC rule to the QoS flow 3. For a specific implementation of binding the first PCC rule to the QoS flow 3, refer to an existing binding mechanism. Details are not described herein.

S904: If there is no such PCC rule, the SMF network element creates a QoS flow according to the first PCC rule, and binds the first PCC rule to the created QoS flow.

Certainly, if there is no such PCC rule in which the binding parameters at each level are the same as the binding parameters at each level in the first PCC rule respectively in the PCC rule bound to the existing QoS flow, the SMF network element creates the QoS flow according to the first PCC rule, and binds the first PCC rule to the created QoS flow. For a specific implementation of binding the first PCC rule to the created QoS flow, refer to an existing binding mechanism. Details are not described herein.

For example, assuming that the first PCC rule is shown in the example in step S902, the QoS flow created according to the first PCC rule may include:

QoS profile 1={rank 1: 5QI value=x1, ARP value=y1, MFBR=z11}; and

QoS profile 2={rank 2: 5QI value=x2, ARP value=y2, MFBR=z21}.

According to the charging rule binding method provided in this embodiment of this application, in this embodiment of this application, only the PCC rule in which the binding parameters at each level are the same as the binding parameters at each level in the first PCC rule respectively can be bound to a same QoS flow. Therefore, a problem that a multi-level PCC rule and a single-level PCC rule that have a same binding parameter are bound to a same QoS flow, or multi-level PCC rules having a same binding parameter but different ranks are bound to a same QoS flow is avoided, thereby further avoiding incorrect scheduling by a RAN device.

The actions of the SMF network element in steps S901 to S903 or step S904 may be performed by the processor 701 in the communications device 700 shown in FIG. 7 by invoking the application program code stored in the memory 703. This is not limited in this embodiment.

Figure 10:
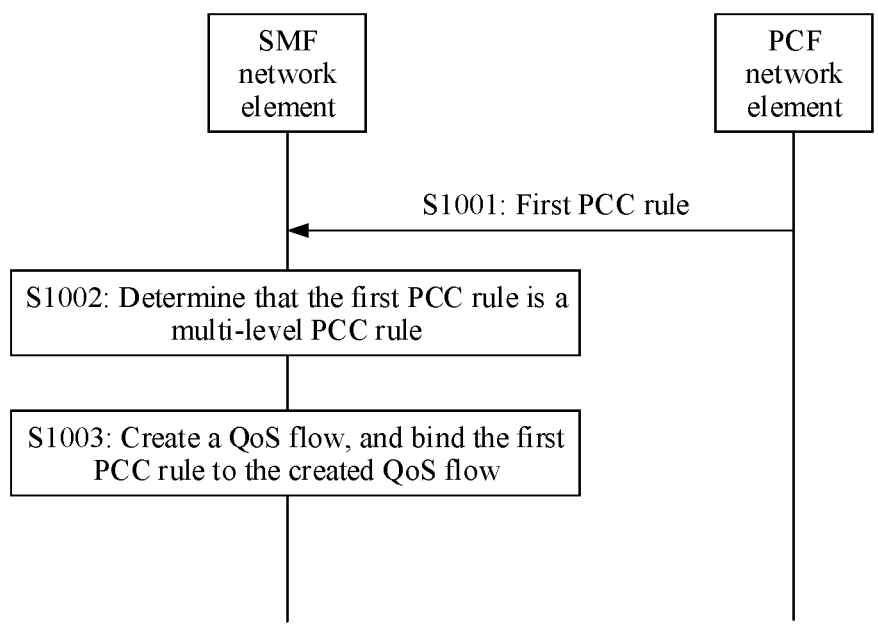
FIG. 10 is a schematic flowchart 3 of a charging rule binding method according to an embodiment of this application.

Alternatively, an example in which the communications system shown in FIG. 3 is applied to the 5G network architecture in the non-roaming scenario shown in FIG. 4a or FIG. 4b is used. FIG. 10 shows a charging rule binding method according to an embodiment of this application. The charging rule binding method includes the following steps.

S1001: A PCF network element sends a first PCC rule to an SMF network element. The SMF network element receives the first PCC rule from the PCF network element.

Optionally, in this embodiment of this application, a form of the first PCC rule may be the same as the form of the first PCC rule shown in step S801, or may be different from the form of the first PCC rule shown in step S801. This is not specifically limited herein.

S1002: The SMF network element determines that the first PCC rule is a multi-level PCC rule.

In this embodiment of this application, the SMF network element may determine, by using an explicit or implicit indication, that the first PCC rule is the multi-level PCC rule.

For example, in a possible implementation, the first PCC rule in this embodiment of this application may include indication information, and the indication information is used to indicate that the first PCC rule is the multi-level PCC rule. Further, that the SMF network element determines that the first PCC rule is a multi-level PCC rule may include: The SMF network element determines, based on the indication information, that the first PCC rule is the multi-level PCC rule.

Optionally, the indication information may be a multi-level indication and may be indicated by using a special flag bit. For example, a 1-bit flag bit is set. A value of 0 indicates a single-level indication, and a value of 1 indicates a multi-level indication. Alternatively, a value of 1 indicates a single-level indication, and a value of 0 indicates a multi-level indication, or the like. This is not specifically limited herein.

Alternatively, in another possible implementation, the first PCC rule in this embodiment of this application may include N alternative QoS parameter sets, where N is a positive integer greater than 1. Further, that the SMF network element determines that the first PCC rule is a multi-level PCC rule may include: The SMF network element determines, based on the N alternative QoS parameter sets, that the first PCC rule is the multi-level PCC rule.

It may be understood that in this embodiment of this application, each alternative QoS parameter set may correspond to one rank value, and one rank value corresponds to one level of binding parameters. Unified descriptions are provided herein. Details are not described below.

Optionally, in this embodiment of this application, that the SMF network element determines, based on the N alternative QoS parameter sets, that the first PCC rule is the multi-level PCC rule may include: The SMF network element determines, based on N rank values corresponding to the N alternative QoS parameter sets, that the first PCC rule is the multi-level PCC rule.

S1003: The SMF network element creates a QoS flow according to the first PCC rule, and binds the first PCC rule to the created QoS flow, where the QoS flow is bound to only the first PCC rule.

In other words, in this embodiment of this application, any multi-level PCC rule sent by the PCF network element to the SMF network element is bound to a unique QoS flow, and no other PCC rule is bound to the QoS flow.

For related descriptions that the SMF network element creates the QoS flow according to the first PCC rule, and binds the first PCC rule to the created QoS flow, refer to step S804 or step S904. Details are not described herein again.

According to the charging rule binding method provided in this embodiment of this application, in this embodiment of this application, each multi-level PCC rule is bound to a different QoS flow. Therefore, a problem that a multi-level PCC rule and a single-level PCC rule that have a same binding parameter are bound to a same QoS flow, or multi-level PCC rules having a same binding parameter but different ranks are bound to a same QoS flow is avoided, thereby further avoiding incorrect scheduling by a RAN device.

The actions of the SMF network element in steps S1001 to S1003 may be performed by the processor 701 in the communications device 700 shown in FIG. 7 by invoking the application program code stored in the memory 703. This is not limited in this embodiment.

It should be noted that the first PCC rule in the embodiments shown in FIG. 8 to FIG. 10 may be a new PCC rule, or a PCC rule obtained by modifying the existing PCC rule. This is not specifically limited in this embodiment of this application.

Figure 12:
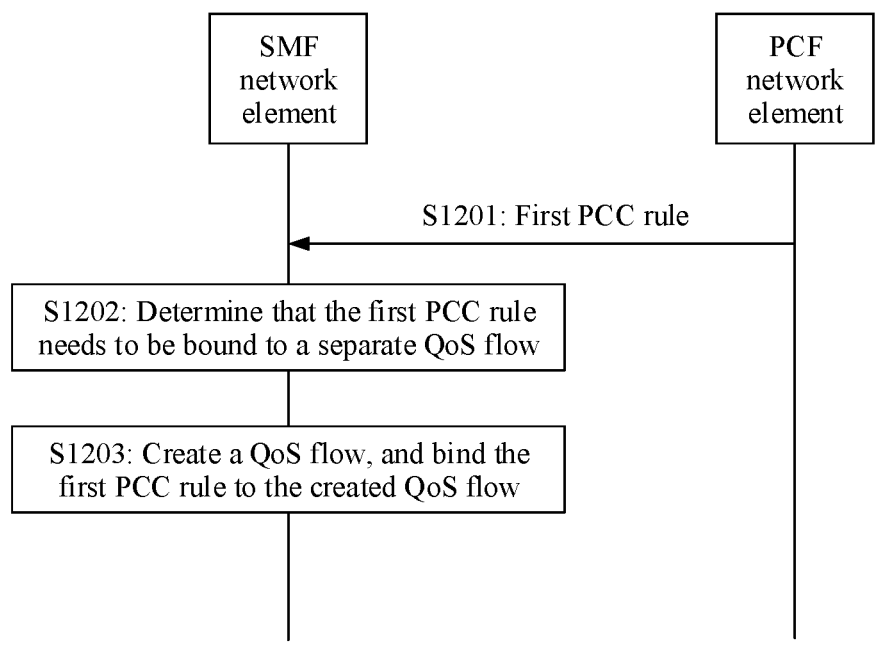
FIG. 12 is a schematic flowchart 4 of a charging rule binding method according to an embodiment of this application.

Alternatively, an example in which the communications system shown in FIG. 3 is applied to the 5G network architecture in the non-roaming scenario shown in FIG. 4a or FIG. 4b is used. FIG. 12 shows another charging rule binding method according to an embodiment of this application. The charging rule binding method includes the following steps.

S1201: A PCF network element sends a first PCC rule to an SMF network element. The SMF network element receives the first PCC rule from the PCF network element.

Optionally, in this embodiment of this application, a form of the first PCC rule may be the same as the form of the first PCC rule shown in step S801, or may be different from the form of the first PCC rule shown in step S801. This is not specifically limited herein.

S1202: The SMF network element determines that the first PCC rule needs to be bound to a separate QoS flow.

In this embodiment of this application, the SMF network element may determine, by using an explicit or implicit indication, that the first PCC rule needs to be bound to the separate QoS flow.

For example, in a possible implementation, the first PCC rule in this embodiment of this application may include indication information. Further, that the SMF network element determines that the first PCC rule needs to be bound to a separate QoS flow may include: The SMF network element determines, based on the indication information, that the first PCC rule needs to be bound to the separate QoS flow.

For example, the indication information may be explicit indication information. To be specific, the indication information is information indicating that the first PCC rule needs to be bound to the separate QoS flow. For example, a name of the indication information may be "bind to separate QoS flow" (bind to independent QoS flow or bind to separate QoS flow), and the indication information may be used to indicate that the PCC rule needs to be bound to a separate QoS flow (indicates that the PCC rule shall be bound to an independent/separate QoS Flow). In this way, the SMF network element binds the PCC rule to the separate QoS flow provided that the indication information exists.

Alternatively, for example, the indication information may be implicit indication information. For example, the indication information may be the multi-level indication in the foregoing embodiment, and may be indicated by using a special flag bit. For example, a 1-bit flag bit is set. A value of 0 indicates a single-level indication, and a value of 1 indicates a multi-level indication. Alternatively, a value of 1 indicates a single-level indication, and a value of 0 indicates a multi-level indication, or the like. This is not specifically limited herein. In this way, the SMF network element may determine, based on the indication information, that the first PCC rule needs to be bound to the separate QoS flow.

S1203: The SMF network element creates a QoS flow according to the first PCC rule, and binds the first PCC rule to the created QoS flow, where the QoS flow is bound to only the first PCC rule.

In other words, in this embodiment of this application, any multi-level PCC rule sent by the PCF network element to the SMF network element is bound to a unique QoS flow, and no other PCC rule is bound to the QoS flow.

Optionally, in this embodiment of this application, the SMF network element may alternatively determine, by using a flag bit in the SMF network element, that a QoS flow is a separate QoS flow. In other words, another PCC rule cannot be bound to the QoS flow. For example, a flag bit of the QoS flow is 1, and the another PCC rule cannot be bound to the QoS flow. For another example, the SMF network element records a QFI of the separate QoS flow, and the another PCC rule cannot be bound to the QoS flow. Unified descriptions are provided herein. Details are not described below.

For related descriptions that the SMF network element creates the QoS flow according to the first PCC rule and binds the first PCC rule to the created QoS flow, refer to step S804 or step S904. Details are not described herein again.

According to the charging rule binding method provided in this embodiment of this application, in this embodiment of this application, each multi-level PCC rule is bound to a different QoS flow. This avoids a problem that a multi-level PCC rule and a single-level PCC rule that have a same binding parameter are bound to a same QoS flow, or that multi-level PCC rules having a same binding parameter but different ranks are bound to a same QoS flow, thereby further avoiding incorrect scheduling by a RAN device.

The actions of the SMF network element in steps S1201 to S1203 may be performed by the processor 701 in the communications device 700 shown in FIG. 7 by invoking the application program code stored in the memory 703. This is not limited in this embodiment.

It should be noted that not only the multi-level PCC rule may cause incorrect scheduling by a RAN device, but also other factors may cause incorrect scheduling. For example, the other factors are as follows:

(1) Multi-access (MA) PDU session: An MA PDU session may include a GBR QoS flow or a non-GBR QoS flow. For the non-GBR QoS flow, the SMF network element delivers QoS profiles (namely, 3GPP access and non-3GPP access) to AN devices on two sides. For the GBR QoS flow, if the GBR QoS flow allows only one access technology, the SMF network element sends a QoS profile to only an allowed AN device. If the GBR QoS flow allows two access technologies, the SMF network element determines a specific AN device to which a QoS profile is to be sent. In other words, the GBR QoS flow includes only one access technology at a time point. A service flow with a GBR requirement may be transmitted through a QoS flow that supports MA, but the service flow does not support MA transmission (for example, supports only 3GPP transmission). Alternatively, a service flow with a GBR requirement may be transmitted through a QoS flow that does not support MA (for example, supports only 3GPP transmission), but the service flow supports MA transmission. In other words, the SMF network element may choose to use an inappropriate access technology to transmit the GBR QoS flow.

To resolve this problem, a possible solution is to use an allowed access mode (for example, a steering mode) as a binding parameter. Particularly, this binding parameter (including a delay critical) GBR and a normal GBR) may be introduced when a 5QI resource type in a PCC rule is a GBR. However, a new binding parameter is added each time a new feature is introduced, which causes complexity to a binding mechanism. In this case, the manner in the embodiment shown in FIG. 12 may also be used to resolve the problem.

Optionally, the indication information in FIG. 12 may be a multi-access indication, and may be indicated by using a special flag bit. For example, a 2-bit flag bit is set. A value of 01 indicates a 3GPP single-access indication, a value of 10 indicates a non-3GPP single-access indication, and a value of 11 indicates a multi-access indication. Alternatively, a value of 1 indicates a single-access indication, and a value of 0 indicates a multi-access indication, or the like. This is not specifically limited herein.

(2) According to an existing standard, a network side (an SMF network element) may establish an ultra-reliability low-latency communication (URLLC) QoS flow. The SMF network element determines, based on an authorized 5QI, a capability of an NG-RAN, and a configuration of an operator, whether to perform redundant transmission. The 5QI includes a QoS characteristic packet error rate (PER), which reflects reliability required by a service. 5G supports a dynamic 5QI. To be specific, a parameter such as a PDB or a PER allocated by a network is delivered, or a same 5QI may have different QoS characteristics. Although service flows with a same 5QI may have different reliability requirements (reflected as having different PDRs), the SMF network element uniformly determines whether to perform redundant transmission on a QoS flow. Consequently, the SMF network element may select an inappropriate manner to transmit the service flow. For example, redundant transmission is determined to be performed on a service flow that does not require redundant transmission, and redundant transmission is determined not to be performed on a service flow that requires redundant transmission.

To resolve this problem, a possible solution is to use a PER as a binding parameter. Particularly, this binding parameter may be introduced when a 5QI resource type in a PCC rule is a delay critical GBR. However, a new binding parameter is added each time a new feature is introduced, which causes complexity to a binding mechanism. In this case, the manner in the embodiment shown in FIG. 12 may also be used to resolve the problem.

Optionally, the indication information in FIG. 12 may be a redundant indication, and may be indicated by using a special flag bit. For example, a 1-bit flag bit is set. A value of 0 indicates a redundant indication, and a value of 1 indicates a non-redundant indication. Alternatively, a value of 1 indicates a redundant indication, and a value of 0 indicates a non-redundant indication, or the like. This is not specifically limited herein.

(3) For a URLLC service, a network side or a RAN side may divide an end-to-end (E2E) PDB into two parts: a PDB of a UPF-RAN and a PDB of RAN-UE. In this way, the RAN may perform scheduling based on the PDB of the RAN-UE. However, because the URLLC service requires a relatively short transmission delay, a difference of several milliseconds in transmission in a core network has relatively great impact on scheduling of the RAN. To resolve this problem, a possible solution is as follows: After selecting a UPF network element, the SMF network element obtains the PDB of the UPF-RAN based on a configuration, and sends the PDB of the UPF-RAN to a RAN device in an N2 session management (SM) message; and the RAN device obtains the PDB of the RAN-UE based on the E2E PDB included in a QoS profile and the PDB that is of the UPF-RAN and that is sent by the SMF network element. However, because the SMF network element may manage a plurality of PDU session anchor (PSA) UPF network elements, different service flows in a same QoS flow may be transmitted by different PSA UPF network elements. Deployment locations of the different PSA UPF network elements are probably different. In this way, remaining scheduling time of data packets from the different PSA UPF network elements in the same QoS flow is different on the RAN device side. However, the RAN device cannot distinguish between the data packets from the different PSA UPF network elements in the same QoS flow according to the prior art. In this case, the manner in the embodiment shown in FIG. 12 may also be used to resolve the problem.

(4) A new scenario in which both evolved universal terrestrial radio access (E-UTRA) and new radio (NR) are connected to a 5G core network (5GC) is proposed. Because coverage of the E-UTRA is better than that of the NR, and a bandwidth of the NR is higher than that of the E-UTRA, an operator expects that different base stations can be used for flow splitting based on different application attributes and a RAN device makes a final decision. However, the RAN device cannot perform application detection. Therefore, the RAN device essentially cannot perform flow splitting based on the different application attributes. In this case, the manner in the embodiment shown in FIG. 12 may also be used to resolve the problem.

(5) For some services (for example, a URLLC service), a network side may need to provide a QoS monitoring service. To be specific, the network monitors whether QoS of these services can be currently satisfied by the network. The network side may perform monitoring at a granularity of a QoS flow. To be specific, some service flows in a QoS flow may need to be reported, and some other service flows in the QoS flow do not need to be reported. In this case, the manner in the embodiment shown in FIG. 12 may also be used to resolve the problem.

(6) For some services whose MFBRs are greater than GFBRs (maximum bit rates of the services are greater than guaranteed bit rates), if the services are bound to a same QoS flow, an excess bit rate (a part exceeding a guaranteed bit rate) of one service may use a part of a GBR of another service. In this case, the manner in the embodiment shown in FIG. 12 may also be used to resolve the problem.

(7) For a time sensitive communication (TSC) service, a RAN device needs to perceive some features of the service and perform scheduling based on these features, to transmit the service. These features are referred to as TSC assistance information (TSCAI). Details are shown in Table 1.

TABLE 1

| Assistance information | Description |
| --- | --- |
| Flow direction | Direction of a TSC flow (uplink or downlink) (The direction of the TSC flow (uplink or downlink)) |
| Periodicity | Time period between start moments of two data bursts (It refers to the time period between start of two bursts) |
| Burst arrival time | Arrival time of a data burst at either an ingress interface (downlink flow direction) of a RAN or an egress interface (uplink flow direction) of UE (The arrival time of the data burst at either the ingress of the RAN (downlink flow direction) or egress interface of the UE (uplink flow direction)) |
| Burst size | For TSC QOS flows, a maximum data burst volume is set to a maximum burst size of aggregated TSC streams to be allocated to this QoS flow (For TSC QoS flows, MDBV is set to the Maximum Burst Size of the aggregated TSC streams to be allocated to this QoS flow). |

When performing QoS control, the RAN device performs QoS control at a granularity of a QoS flow. However, currently, QoS flows are distinguished from each other by using parameters such as a 5QI and an ARP. To be specific, different services in a QoS flow may have different flow directions, periodicities, burst arrival times, burst sizes, and the like, but the RAN device cannot distinguish between the services. Consequently, the RAN device may perform incorrect scheduling.

To resolve this problem, a possible solution is to use all parameters in the TSCAI as binding parameters, or set indexes for all parameters. Each index represents a value determined for a parameter in the TSCAI, and the index is used as the binding parameter. However, a new binding parameter is added each time a new feature is introduced, which causes complexity to a binding mechanism. In this case, the manner in the embodiment shown in FIG. 12 may also be used to resolve the problem.

(8) For a QoS flow whose 5QI resource type is a delay critical GBR, a parameter, namely, a delayed packet discarding identifier is introduced. The delayed packet discarding identifier indicates a RAN device to discard a data packet whose transmission delay exceeds a PDB in the QoS flow.

When performing QoS control, the RAN device performs QoS control at a granularity of a QoS flow. However, currently, QoS flows are distinguished from each other by using parameters such as a 5QI and an ARP. To be specific, different services in a QoS flow may have different packet loss requirements, but the RAN device cannot distinguish between the services. Consequently, the RAN device may perform incorrect scheduling.

To resolve this problem, a possible solution is to use a packet discarding identifier as a binding parameter. However, a new binding parameter is added each time a new feature is introduced, which causes complexity to a binding mechanism. In this case, the manner in the embodiment shown in FIG. 12 may also be used to resolve the problem.

(9) Other problems that need to be resolved by introducing a new binding parameter may be resolved in the manner in the embodiment shown in FIG. 12. This is not specifically limited in this embodiment of this application.

In conclusion, in this embodiment of this application, the PCF network element may determine, in one or more of the following conditions to add the indication information in step S1202 to the first PCC rule:

To ensure that a QoS flow of the first PCC rule is not bound to another PCC rule (whenever it has to be ensured that no other PCC rule is bound to the QoS flow of a PCC rule), the first PCC rule is a multi-level PCC rule;

a service corresponding to the first PCC rule supports multi-access;

a service corresponding to the first PCC rule is a URLLC service (for example, a 5QI resource type is a delay critical GBR);

a service corresponding to the first PCC rule requires redundant transmission (for example, a PER is less than a limit value);

a data network access identifier (DNAI) of the first PCC rule is different from a DNAI in another existing PCC rule (in a current PDU session);

a PER in the first PCC rule is different from a PER in another existing PCC rule (in a current PDU session);

a PDB of the first PCC rule is different from a PDB of another existing PCC rule (in a current PDU session); and the first PCC rule is bound to an existing QoS flow based on an existing binding parameter;

a service corresponding to the first PCC rule requires a special radio access technology (RAT), for example, an evolved universal terrestrial radio access network (E-UTRAN);

a maximum bit rate in the first PCC rule is greater than a guaranteed bit rate;

a service corresponding to the first PCC rule requires QoS detection;

a 5QI resource type in the first PCC rule is a delay critical GBR;

a transmission delay of a data packet of a service corresponding to the first PCC rule exceeds a PDB and therefore the data packet needs to be discarded; and a service corresponding to the first PCC rule is a time sensitive service (which may be represented as that the PCC rule includes TSCAI-related information).

It should be noted that in this embodiment of this application, because there is a correspondence between a PCC rule and a service, an attribute of the PCC rule may also be referred to as an attribute of the service corresponding to the PCC rule, and vice versa. For example, that the service corresponding to the first PCC rule supports multi-access may also be referred to as that the first PCC rule supports multi-access. Unified descriptions are provided herein. Details are not described below.

Correspondingly, the indication information in step S1202 may alternatively be any one of the following:

the indication information is information indicating that the first PCC rule is a multi-level PCC rule;

the indication information is information indicating that a service corresponding to the first PCC rule supports multi-access (which may be represented as that the PCC rule includes MA PDU session control (multi-access PDU session control)-related information, for example, a steering mode).

the indication information is information indicating that a service corresponding to the first PCC rule is a URLLC service;

the indication information is information indicating that a service corresponding to the first PCC rule requires redundant transmission;

the indication information is information indicating that a DNAI in the first PCC rule is different from another DNAI in a current session;

the indication information is information indicating that a PER in the first PCC rule is different from another PER in a current session;

the indication information is information indicating that a service corresponding to the first PCC rule requires a first RAT;

the indication information is information indicating that a service corresponding to the first PCC rule requires QoS monitoring;

the indication information is information indicating that a 5QI resource type in the first PCC rule is a delay critical GBR;

the indication information is information indicating that a transmission delay of a data packet of a service corresponding to the first PCC rule exceeds a PDB and therefore the data packet needs to be discarded;

the indication information is information indicating that a maximum bit rate in the first PCC rule is greater than a guaranteed bit rate; or the indication information is information indicating that a service corresponding to the first PCC rule is a time sensitive service (which may be represented as that the PCC rule includes TSCAI-related information).

Certainly, the PCF network element may alternatively determine, based on other information, whether to add the indication information in step S1202 to the first PCC rule, and content of the indication information may alternatively be other content. This is not specifically limited in this embodiment of this application.

It should be noted that the embodiments shown in FIG. 8 to FIG. 10 are all described by using an example in which the communications system shown in FIG. 3 is applied to the 5G network architecture in the non-roaming scenario shown in FIG. 4a or FIG. 4b. If an example in which the communications system shown in FIG. 3 is applied to the local breakout roaming 5G network architecture shown in FIG. 5a or FIG. 5b is used for description, or an example in which the communications system shown in FIG. 3 is applied to the home routed roaming 5G network architecture shown in FIG. 6a or FIG. 6b is used for description, a corresponding charging rule binding method is similar to the method in the foregoing embodiment, and only a related network element needs to be adaptively replaced. Details are not described herein again.

Figure 14:
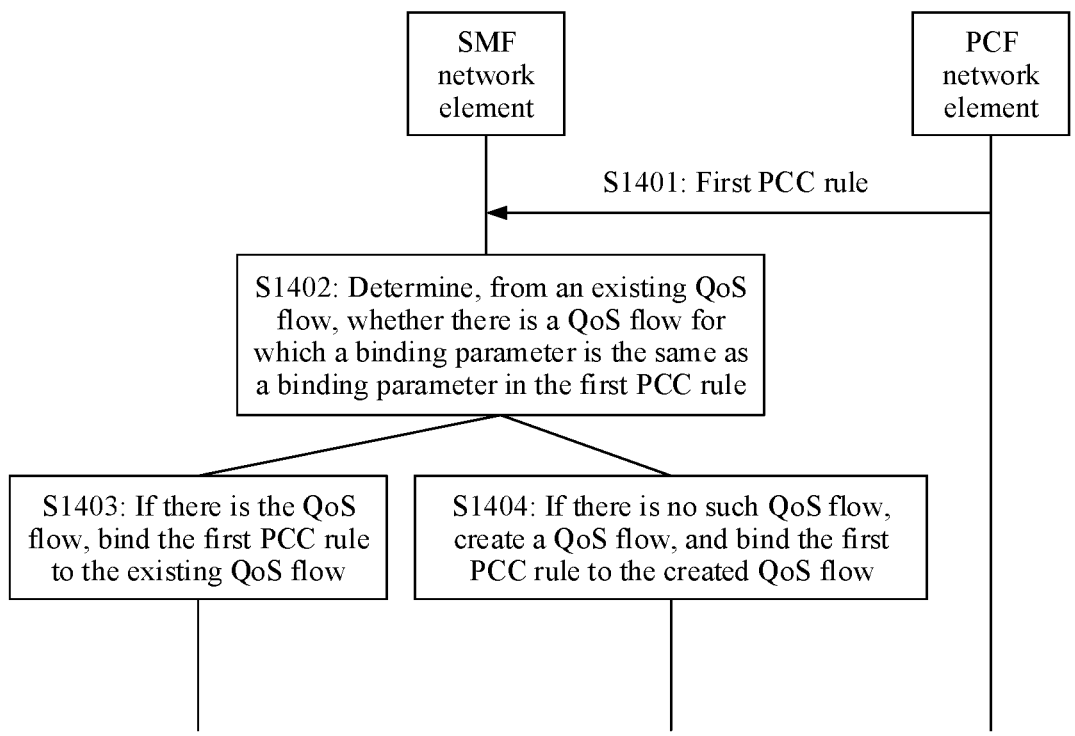
FIG. 14 is a schematic flowchart 5 of a charging rule binding method according to an embodiment of this application.

Alternatively, an example in which the communications system shown in FIG. 3 is applied to the 5G network architecture in the non-roaming scenario shown in FIG. 4a or FIG. 4b is used. FIG. 14 shows a charging rule binding method according to an embodiment of this application. The charging rule binding method includes the following steps.

S1401: A PCF network element sends a first PCC rule to an SMF network element. The SMF network element receives the first PCC rule from the PCF network element.

Optionally, the first PCC rule in this embodiment of this application may be a single-level PCC rule or a multi-level PCC rule. This is not specifically limited in this embodiment of this application.

In this embodiment of this application, QoS parameters in the multi-level PCC rule include a policy control part and an alternative QoS parameter set part. In other words, the multi-level PCC rule includes two parts: a policy control part and an alternative QoS parameter set part. The policy control part is a QoS parameter that needs to be currently used. The alternative QoS parameter set part is a QoS parameter that may be used in the future based on a resource condition of a RAN device.

Optionally, in this embodiment of this application, a form of the first PCC rule may be the same as the form of the first PCC rule shown in step S801, or may be different from the form of the first PCC rule shown in step S801. This is not specifically limited herein.

S1402: The SMF network element determines, from an existing QoS flow, whether there is a QoS flow for which a binding parameter is the same as a binding parameter in the first PCC rule.

Optionally, in this embodiment of this application, the binding parameter in the first PCC rule may include some parameters in an alternative QoS parameter set part, for example, a 5QI. Alternatively, the binding parameter in the first PCC rule may include all parameters in an alternative QoS parameter set part. In other words, all the parameters in the alternative QoS parameter set part may be used as the binding parameter in the first PCC rule. This is not specifically limited in this embodiment of this application.

For example, it is assumed that the first PCC rule (namely, a PCC rule 1) may include:
policy control part: {5QI value=x0, ARP value=y0, MFBR=z00};
alternative QoS parameter set 1={5QI value=x1, MFBR=z11}; and
alternative QoS parameter set 2={5QI value=x2, MFBR=z21}.

Correspondingly, a value of the binding parameter may include:
value of a binding parameter of a policy control part: {5QI value=x0, ARP value=y0}; and
value of a binding parameter of an alternative QoS parameter set part: {5QI value=x1, x2}.

Alternatively, correspondingly, a value of the binding parameter may include:
value of a binding parameter of a policy control part: {5QI value=x0, ARP value=y0}; and
value of a binding parameter of an alternative QoS parameter set part: {5QI value=x1, MFBR=z11; 5QI value=x2, MFBR=z21}.

Optionally, in this embodiment of this application, that the SMF network element determines, from an existing QoS flow, whether there is a QoS flow for which a binding parameter is the same as a binding parameter in the first PCC rule includes: If the SMF network element determines, from a PCC rule bound to the existing QoS flow, that there is a second PCC rule in which a value of a binding parameter of a policy control part is the same as a value of a binding parameter of a policy control part in the first PCC rule, and a value of a binding parameter of an alternative QoS parameter set part in the second PCC rule is the same as a value of a binding parameter of an alternative QoS parameter set part in the first PCC rule, the SMF network element determines, from the existing QoS flow, that there is the QoS flow for which the binding parameter is the same as the binding parameter in the first PCC rule; or if the SMF network element determines, from a PCC rule bound to the existing QoS flow, that there is no such PCC rule in which a value of a binding parameter of a policy control part is the same as a value of a binding parameter of a policy control part in the first PCC rule, the SMF network element determines, from the existing QoS flow, that there is no such QoS flow for which the binding parameter is the same as the binding parameter in the first PCC rule.

It should be noted that in this embodiment of this application, the QoS flow for which the binding parameter is the same as the binding parameter in the first PCC rule needs to meet the following: Binding parameters of the policy control part are the same, and binding parameters of the alternative QoS parameter set part are the same, but a sequence of the binding parameters of the alternative QoS parameter set part in the PCC rule may be different. Unified descriptions are provided herein. Details are not described below.

For example, it is assumed that a PCC rule bound to an existing QoS flow 1 includes a PCC rule 2, and the PCC rule 2 may include:
policy control part: {5QI value=x0, ARP value=y0, MFBR=z00};
alternative QoS parameter set 1={5QI value=x1, MFBR=z11};
alternative QoS parameter set 2={5QI value=x2, MFBR=z21}; and
alternative QoS parameter set 3={5QI value=x2, MFBR=z31}.

Correspondingly, a value of the binding parameter may include:
value of a binding parameter of a policy control part: {5QI value=x0, ARP value=y0}; and
value of a binding parameter of an alternative QoS parameter set part: {5QI value=x1, x2}.

Alternatively, correspondingly, a value of the binding parameter may include:

value of a binding parameter of a policy control part: {5QI value=x0, ARP value=y0}; and value of a binding parameter of an alternative QoS parameter set part: {5QI value=x1, MFBR=z11; 5QI value=x2, MFBR=z21; 5QI value=x2, MFBR=z31}.

For example, it is assumed that a PCC rule bound to an existing QoS flow 2 includes a PCC rule 3, and the PCC rule 3 may include:

policy control part: {5QI value=x1, ARP value=y1, MFBR=z00};

alternative QoS parameter set 1={5QI value=x1, MFBR=z11}; and alternative QoS parameter set 2={5QI value=x2, MFBR=z21}.

Correspondingly, a value of the binding parameter may include:

value of a binding parameter of a policy control part: {5QI value=x1, ARP value=y1}; and value of a binding parameter of an alternative QoS parameter set part: {5QI value=x1, x2}.

Alternatively, correspondingly, a value of the binding parameter may include:

value of a binding parameter of a policy control part: {5QI value=x1, ARP value=y1}; and value of a binding parameter of an alternative QoS parameter set part: {5QI value=x1, MFBR=z11; 5QI value=x2, MFBR=z21}.

When the binding parameter in the first PCC rule includes the binding parameter of the alternative QoS parameter set part, the SMF network element may determine that the binding parameter of the existing QoS flow 1 is the same as the binding parameter in the first PCC rule, and the SMF network element may determine that the binding parameter of the existing QoS flow 2 is different from the binding parameter in the first PCC rule.

Further, in this embodiment of this application, if the SMF network element determines that there is the QoS flow for which the binding parameter is the same as the binding parameter in the first PCC rule, the SMF network element performs step S1403. Alternatively, if the SMF network element determines that there is no such QoS flow for which the binding parameter is the same as the binding parameter in the first PCC rule, the SMF network element performs step S1404.

S1403: If there is the QoS flow, the SMF network element binds the first PCC rule to the existing QoS flow.

S1404: If there is no such QoS flow, the SMF network element creates a QoS flow according to the first PCC rule and binds the first PCC rule to the created QoS flow.

For a specific implementation of binding the first PCC rule to the created QoS flow, refer to an existing binding mechanism. Details are not described herein.

According to the charging rule binding method provided in this embodiment of this application, in this embodiment of this application, only a PCC rule for which a binding parameter is the same as the binding parameter in the first PCC rule can be bound to a same QoS flow. Therefore, a problem that a multi-level PCC rule and a single-level PCC rule that have a same binding parameter are bound to a same QoS flow is avoided, thereby further avoiding incorrect scheduling by a RAN device.

Figure 15:
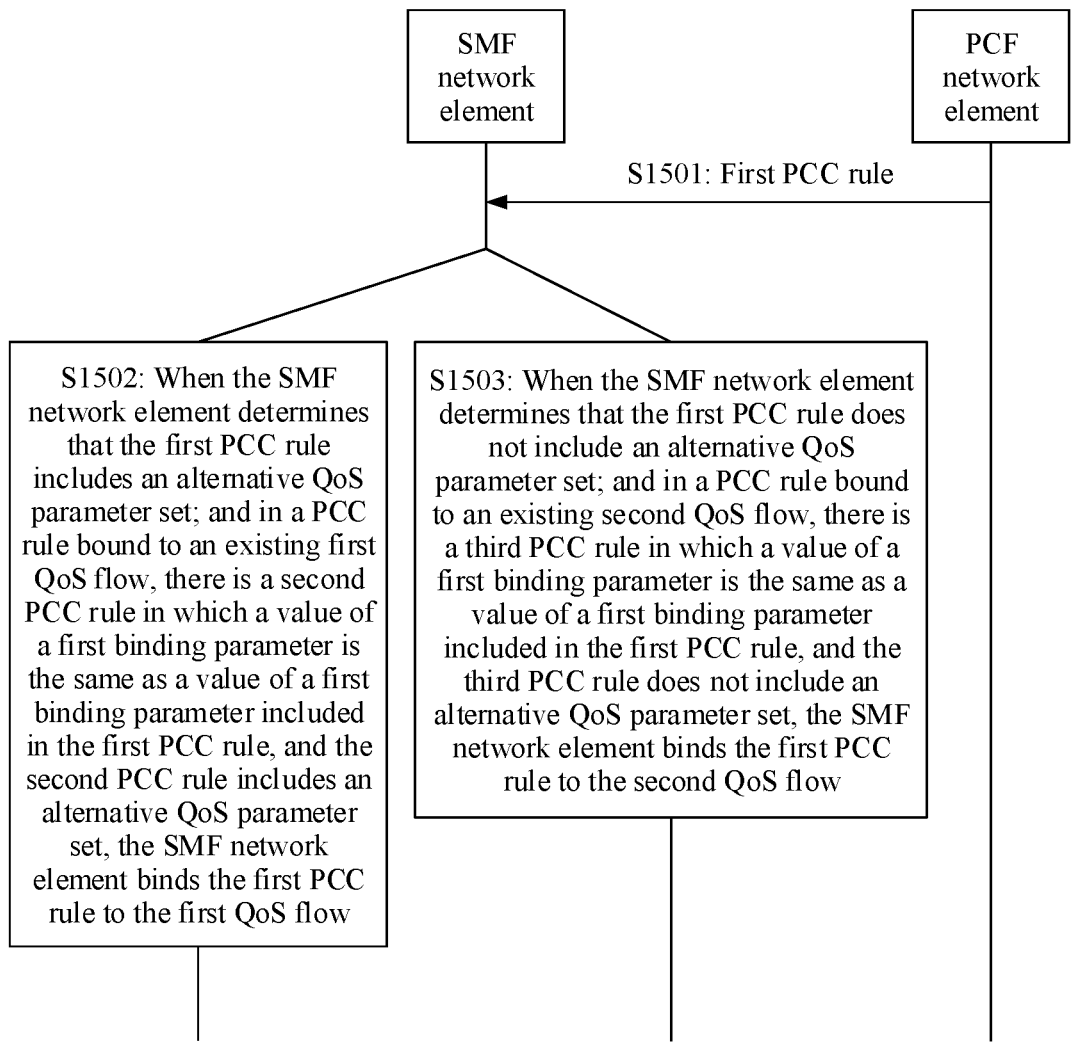
FIG. 15 is a schematic flowchart 6 of a charging rule binding method according to an embodiment of this application.

Optionally, in this embodiment of this application, the alternative QoS parameter set may also be directly used as the binding parameter. To be specific, in the "binding parameter" part in a specific implementation, the alternative QoS parameter set may be used as an optional binding parameter. PCC rules include a PCC rule with an alternative QoS parameter set and a PCC rule without an alternative QoS parameter set. The PCC rule with an alternative QoS parameter set and the PCC rule without an alternative QoS parameter set cannot be bound to a same QoS flow. In this scenario, an example in which the communications system shown in FIG. 3 is applied to the 5G network architecture in the non-roaming scenario shown in FIG. 4a or FIG. 4b is used. FIG. 15 shows a charging rule binding method according to an embodiment of this application. The charging rule binding method includes the following steps.

S1501: Same as step S1401 in the embodiment shown in FIG. 14. For related descriptions, refer to the embodiment shown in FIG. 14. Details are not described herein again.

S1502: When the SMF network element determines that the first PCC rule includes an alternative QoS parameter set; and in a PCC rule bound to an existing first QoS flow, there is a second PCC rule in which a value of a first binding parameter is the same as a value of a first binding parameter included in the first PCC rule, and the second PCC rule includes an alternative QoS parameter set, the SMF network element binds the first PCC rule to the first QoS flow.

The first binding parameter in this embodiment of this application is a binding parameter other than the alternative QoS parameter set, for example, a 5QI, an ARP, QNC, a priority level, an averaging window, or an MDBV. This is not specifically limited in this embodiment of this application.

S1503: When the SMF network element determines that the first PCC rule does not include an alternative QoS parameter set; and in a PCC rule bound to an existing second QoS flow, there is a third PCC rule in which a value of a first binding parameter is the same as a value of a first binding parameter included in the first PCC rule, and the third PCC rule does not include an alternative QoS parameter set, the SMF network element binds the first PCC rule to the second QoS flow.

Certainly, in this embodiment of this application, if the SMF network element determines, from a PCC rule bound to an existing QoS flow, that there is no such PCC rule in which a value of a first binding parameter is the same as the value of the first binding parameter included in the first PCC rule, the SMF network element creates a QoS flow according to the first PCC rule, and binds the first PCC rule to the created QoS flow. For a specific implementation of binding the first PCC rule to the created QoS flow, refer to an existing binding mechanism. Details are not described herein.

In other words, in this embodiment of this application, when other binding parameters in PCC rules are the same, one or more PCC rules that include alternative QoS parameter sets may be considered as PCC rules having a same binding parameter and one or more PCC rules that do not include alternative QoS parameter sets may be considered as PCC rules having a same binding parameter. Further, the one or more PCC rules having the same binding parameter can be bound to a same QoS flow, and the one or more PCC rules having the different binding parameters cannot be bound to a same QoS flow. In this way, a problem that a multi-level PCC rule and a single-level PCC rule that have a same binding parameter are bound to a same QoS flow is avoided, thereby further avoiding incorrect scheduling by a RAN device.

It may be understood that in the foregoing embodiments, methods and/or steps implemented by the session management network element may also be implemented by a component (for example, a chip or a circuit) that can be used in the session management network element, and methods and/or steps implemented by the policy control network element may also be implemented by a component (for example, a chip or a circuit) that can be used in the policy control network element.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the session management network element in the foregoing method embodiments, or an apparatus including the session management network element, or a component that can be used in the session management network element. Alternatively, the communications apparatus may be the policy control network element in the foregoing method embodiments, or an apparatus including the policy control network element, or a component that can be used in the policy control network element. It can be understood that to implement the foregoing functions, the communications apparatus includes a corresponding hardware structure and/or software module for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division and may be other division in an actual implementation.

Figure 11:
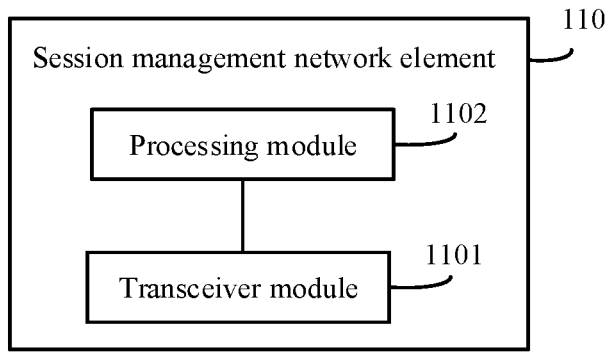
FIG. 11 is a schematic structural diagram of a session management network element according to an embodiment of this application.

For example, the communications apparatus is the session management network element in the foregoing method embodiments. FIG. 11 is a schematic structural diagram of a session management network element 110. The session management network element 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communications interface.

In a possible implementation, the transceiver module 1101 is configured to receive a first PCC rule from a policy control network element, where the first PCC rule includes a binding parameter, and a binding parameter at leach level in the binding parameter corresponds to one rank value. The processing module 1102 is configured to determine, from a PCC rule bound to an existing QoS flow, whether there is a PCC rule in which a binding parameter corresponding to each of all rank values is the same as a binding parameter that is in the first PCC rule and that corresponds to a same rank value in all rank values. The processing module 1102 is further configured to: if there is the PCC rule, bind the first PCC rule to the existing QoS flow. Alternatively, the processing module 1102 is further configured to: if there is no such PCC rule, create a QoS flow according to the first PCC rule, and bind the first PCC rule to the created QoS flow.

Optionally, that a binding parameter at leach level in the binding parameter corresponds to one rank value includes: a binding parameter at leach level in the binding parameter includes the one rank value.

Alternatively, optionally, that a binding parameter at leach level in the binding parameter corresponds to one rank value includes: the first PCC rule further includes the rank value corresponding to a binding parameter at leach level in the binding parameter.

In another possible implementation, the transceiver module 1101 is configured to receive a first PCC rule from a policy control network element. The processing module 1102 is configured to determine, from a PCC rule bound to an existing QoS flow, whether there is a PCC rule in which binding parameters at each level are the same as binding parameters at each level in the first PCC rule respectively. The processing module 1102 is further configured to: if there is the PCC rule, bind the first PCC rule to the existing QoS flow. Alternatively, the processing module 1102 is further configured to: if there is no such PCC rule, create a QoS flow according to the first PCC rule, and bind the first PCC rule to the created QoS flow.

Optionally, that the processing module 1102 is configured to determine, from a PCC rule bound to an existing QoS flow, whether there is a PCC rule in which binding parameters at each level are the same as binding parameters at each level in the first PCC rule respectively includes: The processing module 1102 is configured to determine, from the PCC rule bound to the existing QoS flow, whether there is a PCC rule for which a corresponding maximum rank value is the same as a maximum rank value corresponding to the first PCC rule. If there is a second PCC rule for which a corresponding maximum rank value is the same as the maximum rank value corresponding to the first PCC rule, and binding parameters at each level in the second PCC rule are the same as the binding parameters at each level in the first PCC rule respectively, the processing module 1102 determines, from the PCC rule bound to the existing QoS flow, that there is the PCC rule in which the binding parameters at each level are the same as the binding parameters at each level in the first PCC rule respectively; or if there is no such PCC rule for which a corresponding maximum rank value is the same as the maximum rank value corresponding to the first PCC rule, the processing module 1102 determines, from the PCC rule bound to the existing QoS flow, that there is no such PCC rule in which the binding parameters at each level are the same as the binding parameters at each level in the first PCC rule respectively.

In still another possible implementation, the transceiver module 1101 is configured to receive a first PCC rule from a policy control network element. The processing module 1102 is configured to determine that the first PCC rule is a multi-level PCC rule. The processing module 1102 is further configured to: create a QoS flow according to the first PCC rule and bind the first PCC rule to the created QoS flow, where the QoS flow is bound to only the first PCC rule.

Optionally, the first PCC rule includes indication information, and the indication information is used to indicate that the first PCC rule is the multi-level PCC rule. That the processing module 1102 is configured to determine that the first PCC rule is a multi-level PCC rule includes: The processing module 1102 is configured to determine, based on the indication information, that the first PCC rule is the multi-level PCC rule.

Alternatively, optionally, the first PCC rule includes N alternative QoS parameter sets, and N is a positive integer greater than 1. That the processing module 1102 is configured to determine that the first PCC rule is a multi-level PCC rule includes: The processing module 1102 is configured to determine, based on the N alternative QoS parameter sets, that the first PCC rule is the multi-level PCC rule.

In yet another possible implementation, the transceiver module 1101 is configured to receive a first PCC rule from a policy control network element. The processing module 1102 is configured to determine that the first PCC rule needs to be bound to a separate QoS flow. The processing module 1102 is further configured to: create a QoS flow according to the first PCC rule and bind the first PCC rule to the created QoS flow.

Optionally, the first PCC rule includes indication information. That the processing module 1102 is configured to determine that the first PCC rule needs to be bound to a separate QoS flow includes: The processing module 1102 is configured to determine, based on the indication information, that the first PCC rule needs to be bound to the separate QoS flow.

In still yet another possible implementation, the transceiver module 1101 is configured to receive a first PCC rule from a policy control network element, where the first PCC rule includes a binding parameter. The processing module 1102 is configured to determine, from an existing QoS flow, whether there is a QoS flow for which a binding parameter is the same as the binding parameter in the first PCC rule. The processing module 1102 is further configured to: if there is the QoS flow, bind the first PCC rule to the existing QoS flow. Alternatively, the processing module 1102 is further configured to: if there is no such QoS flow, create a QoS flow according to the first PCC rule, and bind the first PCC rule to the created QoS flow.

Optionally, that the processing module 1102 is configured to determine, from an existing QoS flow, whether there is a QoS flow for which a binding parameter is the same as the binding parameter in the first PCC rule includes: The processing module 1102 is configured to: when determining that in a PCC rule bound to the existing QoS flow, there is a second PCC rule in which a value of a binding parameter of a policy control part is the same as a value of a binding parameter of a policy control part in the first PCC rule, and a value of a binding parameter of an alternative QoS parameter set part in the second PCC rule is the same as a value of a binding parameter of an alternative QoS parameter set part in the first PCC rule, determine, from the existing quality of service flow QoS flow, that there is the QoS flow for which the binding parameter is the same as the binding parameter in the first PCC rule.

In still yet another possible implementation, the transceiver module 1101 is configured to receive a first PCC rule from a policy control network element, where the first PCC rule includes a first binding parameter. The processing module 1102 is configured to: when determining that the first PCC rule includes an alternative QoS parameter set; and in a PCC rule bound to an existing first QoS flow, there is a second PCC rule in which a value of the first binding parameter is the same as a value of the first binding parameter included in the first PCC rule and the second PCC rule includes an alternative QoS parameter set, bind the first PCC rule to the existing first QoS flow. Alternatively, the processing module 1102 is configured to: when determining that the first PCC rule does not include an alternative QoS parameter set; and in a PCC rule bound to an existing second QoS flow, there is a third PCC rule in which a value of a first binding parameter is the same as a value of the first binding parameter included in the first PCC rule, and the third PCC rule does not include an alternative QoS parameter set, bind the first PCC rule to the existing second QoS flow.

All related content of the steps in the foregoing method embodiments may be cited in function descriptions of corresponding function modules. Details are not described herein again.

In this embodiment, the session management network element 110 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the session management network element 110 may be in a form of the communications device 700 shown in FIG. 7.

For example, the processor 701 in the communications device 700 shown in FIG. 7 may invoke the computer execution instruction stored in the memory 703 so that the communications device 700 performs the charging rule binding method in the foregoing method embodiments.

Specifically, functions/implementation processes of the transceiver module 1101 and the processing module 1102 in FIG. 11 may be implemented by the processor 701 in the communications device 700 shown in FIG. 7 by invoking the computer execution instruction stored in the memory 703. Alternatively, a function/an implementation process of the processing module 1102 in FIG. 11 may be implemented by the processor 701 in the communications device 700 shown in FIG. 7 by invoking the computer execution instruction stored in the memory 703, and a function/an implementation process of the transceiver module 1101 in FIG. 11 may be implemented by using the communications interface 704 in the communications device 700 shown in FIG. 7.

The session management network element 110 provided in this embodiment may perform the foregoing charging rule binding method. Therefore, for a technical effect that can be obtained by the session management network element 110, refer to the foregoing method embodiment. Details are not described herein again.

Figure 13:
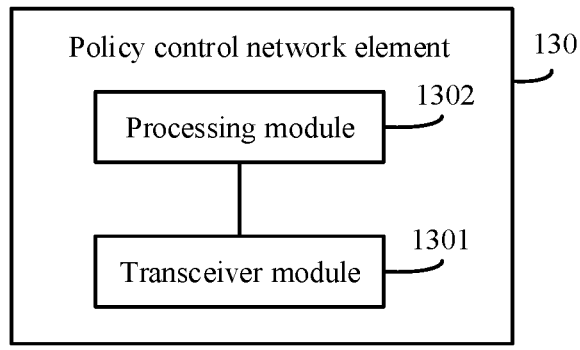
FIG. 13 is a schematic structural diagram of a policy control network element according to an embodiment of this application.

Alternatively, for example, the communications apparatus is the policy control network element in the foregoing method embodiments. FIG. 13 is a schematic structural diagram of a policy control network element 130. The policy control network element 130 includes a transceiver module 1301 and a processing module 1302. The transceiver module 1301 may also be referred to as a transceiver unit, and is configured to implement a transceiver function. For example, the transceiver module 1301 may be a transceiver circuit, a transceiver, a transceiver, or a communications interface.

The processing module 1302 is configured to determine that a first PCC rule needs to be bound to a separate QoS flow. The transceiver module 1301 is configured to send the first PCC rule to a session management network element, where the first PCC rule includes indication information, and the indication information is used to indicate that the first PCC rule needs to be bound to the separate QoS flow.

Optionally, that the processing module 1302 is configured to determine that a first PCC rule needs to be bound to a separate QoS flow includes:

The processing module 1302 is configured to: when one or more of the following conditions are met, determine that the first PCC rule needs to be bound to the separate QoS flow:

to ensure that a QoS flow of the first PCC rule is not bound to another PCC rule, the first PCC rule is a multi-level PCC rule;

a service corresponding to the first PCC rule supports multi-access;

a service corresponding to the first PCC rule is a URLLC service;

a service corresponding to the first PCC rule requires redundant transmission;

a DNAI in the first PCC rule is different from another DNAI in a current session;

a PER in the first PCC rule is different from another PER in a current session;

a service corresponding to the first PCC rule requires a first radio access technology RAT;

a maximum bit rate in the first PCC rule is greater than a guaranteed bit rate;

a service corresponding to the first PCC rule requires QoS detection;

a transmission delay of a data packet of a service corresponding to the first PCC rule exceeds a PDB and therefore the data packet needs to be discarded;

a 5QI resource type in the first PCC rule is a delay critical GBR; and a service corresponding to the first PCC rule is a time sensitive service.

All related content of the steps in the foregoing method embodiments may be cited in function descriptions of corresponding function modules. Details are not described herein again.

In this embodiment, the policy control network element 130 is presented in a form of function modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the policy control network element 130 may be in a form of the communications device 700 shown in FIG. 7.

For example, the processor 701 in the communications device 700 shown in FIG. 7 may invoke the computer execution instruction stored in the memory 703 so that the communications device 700 performs the charging rule binding method in the foregoing method embodiments.

Specifically, functions/implementation processes of the transceiver module 1301 and the processing module 1302 in FIG. 13 may be implemented by the processor 701 in the communications device 700 shown in FIG. 7 by invoking the computer execution instruction stored in the memory 703. Alternatively, a function/an implementation process of the processing module 1302 in FIG. 13 may be implemented by the processor 701 in the communications device 700 shown in FIG. 7 by invoking the computer execution instruction stored in the memory 703, and a function/an implementation process of the transceiver module 1301 in FIG. 13 may be implemented by using the communications interface 704 in the communications device 700 shown in FIG. 7.

The policy control network element 130 provided in this embodiment may perform the foregoing charging rule binding method. Therefore, for a technical effect that can be obtained by the policy control network element 130, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of a computer program instruction and is stored in a memory. A processor may be configured to execute the program instruction to implement the foregoing method procedures. The processor may be built in an SoC (system-on-a-chip) or an ASIC, or may be an independent semiconductor chip. The processor includes a core configured to perform an operation or processing by executing a software instruction and may further include a necessary hardware accelerator, for example, a field programmable gate array (FPGA), a PLD, or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store a necessary program instruction and necessary data. The processor may invoke program code stored in the memory, to indicate the communications apparatus to perform the method in any one of the foregoing method embodiments. Certainly, the communications apparatus may not include the memory. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A charging rule binding method, wherein the method comprises:
   receiving, by a session management network element, a first policy and charging control (PCC) rule from a policy control network element, wherein the first PCC rule comprises indication information, and the indication information indicates that a service corresponding to the first PCC rule is a time sensitive service; and
   binding, by the session management network element, the first PCC rule to a quality of service (QoS) flow, wherein no other PCC rule is bound to the QoS flow.

2. The method according to claim 1, further comprising:
   determining, by the session management network element based on the indication information, that the first PCC rule needs to be bound to the QoS flow.

3. The method according to claim 1, further comprising:
   creating, by the session management network element, the QoS flow according to the first PCC rule.

4. The method according to claim 1, wherein the indication information further indicates one or more of:
   that the first PCC rule is a multi-level PCC rule; or
   that the service corresponding to the first PCC rule requires QoS monitoring.

5. The method according to claim 1, further comprising:
   determining, by the session management network element based on a flag bit in the session management network element, that a second PCC rule cannot be bound to the QoS flow.

6. The method according to claim 1, further comprising:
   sending, by the session management network element to a radio access network device, time sensitive communication assistance information (TSCAI) of the time sensitive service corresponding to the QoS flow.

7. A charging rule binding method, wherein the method comprises:
   determining, by a policy control network element, that a first policy and charging control (PCC) rule corresponds to a time sensitive service, wherein the first PCC rule needs to be bound to a quality of service flow (QoS) flow, and no other PCC rule is bound to the QoS flow; and
   sending, by the policy control network element, the first PCC rule to a session management network element, wherein the first PCC rule comprises indication information, wherein the indication information indicates that the first PCC rule corresponds to the time sensitive service.

8. The method according to claim 7, further comprising:
   including, by the policy control network element, the indication information in the first PCC rule.

9. The method according to claim 7, wherein the indication information further indicates one or more of:
   that the QoS flow corresponding to the first PCC rule is not bound to any other PCC rule;
   that the first PCC rule is a multi-level PCC rule; or
   that the time sensitive service corresponding to the first PCC rule requires QoS detection.

10. A session management network element, comprising:
    at least one processor; and
    one or more memories coupled to the at least one processor and configured to store instructions for execution by the at least one processor such that when executed, cause the session management network element to perform operations comprising:
    receiving a first policy and charging control (PCC) rule from a policy control network element, wherein the first PCC rule comprises indication information, and the indication information indicates that a service corresponding to the first PCC rule is a time sensitive service; and
    binding the first PCC rule to a quality of service (QoS) flow, wherein no other PCC rule is bound to the QoS flow.

11. The session management network element according to claim 10, wherein the operations further comprise:
    determining, based on the indication information, that the first PCC rule needs to be bound to the QoS flow.

12. The session management network element according to claim 10, wherein the operations further comprise creating the QoS flow according to the first PCC rule.

13. The session management network element according to claim 10, wherein the indication information indicates one or more of:
    that the first PCC rule is a multi-level PCC rule; or
    that the service corresponding to the first PCC rule requires QoS monitoring.

14. The session management network element according to claim 10, wherein the operations further comprise:
    determining, based on a flag bit in the session management network element, that a second PCC rule cannot be bound to the QoS flow.

15. The session management network element according to claim 10, wherein the operations further comprise:
sending, to a radio access network device, time sensitive communication assistance information (TSCAI) of the time sensitive service corresponding to the QoS flow.

16. A policy control network element, comprising:
at least one processor; and
one or more memories coupled to the at least one processor and configured to store instructions for execution by the at least one processor such that when executed, cause the policy control network element to perform operations comprising:
determining that a first policy and charging control (PCC) rule corresponds to a time sensitive service, wherein the first PCC rule needs to be bound to a quality of service flow (QoS) flow, and no other PCC rule is bound to the QoS flow; and
sending the first PCC rule to a session management network element, wherein the first PCC rule comprises indication information, wherein the indication information indicates that the first PCC rule corresponds to the time sensitive service.

17. The policy control network element according to claim 16, wherein the operations further comprise:
including the indication information in the first PCC rule.

18. The policy control network element according to claim 16, wherein the indication information further indicates one or more of:
that a QoS flow of the first PCC rule is not bound to any other PCC rule;
that the first PCC rule is a multi-level PCC rule; or
that the time sensitive service corresponding to the first PCC rule requires QoS detection.

* * * * *